(12) United States Patent
Saito et al.

(10) Patent No.: US 7,918,928 B2
(45) Date of Patent: Apr. 5, 2011

(54) PIGMENT INK, INK JET RECORDING METHOD, INK CARTRIDGE, RECORDING UNIT AND INK JET RECORDING APPARATUS

(75) Inventors: Takashi Saito, Kawasaki (JP);
Katsuhiro Shirota, Kawasaki (JP);
Shinichi Hakamada, Kawasaki (JP);
Masashi Tsujimura, Kawasaki (JP);
Fumihiko Mukae, Tokyo (JP);
Katsuhiko Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 180 days.

(21) Appl. No.: 12/025,893

(22) Filed: Feb. 5, 2008

(65) Prior Publication Data
US 2008/0193647 A1      Aug. 14, 2008

(30) Foreign Application Priority Data

| Feb. 9, 2007 | (JP) | 2007-030896 |
| Feb. 9, 2007 | (JP) | 2007-031183 |
| Feb. 9, 2007 | (JP) | 2007-031330 |
| Jan. 25, 2008 | (JP) | 2008-014345 |

(51) Int. Cl.
*C09D 11/00* (2006.01)
*B41J 2/175* (2006.01)
*C07F 7/00* (2006.01)

(52) U.S. Cl. ........ 106/31.89; 347/86; 347/100; 556/434

(58) Field of Classification Search .................... None
See application file for complete search history.

(56) References Cited

U.S. PATENT DOCUMENTS

| 3,366,590 A | 1/1968 | Taft | |
| 3,389,110 A | 6/1968 | Taft | |
| 4,013,607 A | 3/1977 | Dwyer et al. | |
| 4,177,178 A | 12/1979 | Das et al. | |
| 4,597,794 A * | 7/1986 | Ohta et al. | 347/100 |
| 4,804,411 A | 2/1989 | Eida et al. | 106/22 |
| 4,864,324 A | 9/1989 | Shirota et al. | 346/1.1 |
| 5,059,246 A | 10/1991 | Yamamoto et al. | 106/22 |
| 5,074,914 A | 12/1991 | Shirota et al. | 106/22 |
| 5,106,417 A * | 4/1992 | Hauser et al. | 524/104 |
| 5,110,356 A | 5/1992 | Shirota et al. | 106/22 |
| 5,118,351 A | 6/1992 | Shirota et al. | 106/22 |

(Continued)

FOREIGN PATENT DOCUMENTS

CN         1693383 A         11/2005

(Continued)

OTHER PUBLICATIONS

Momentive Performance Materials, "Silwet Surfactants", 2008, 28 pages.*

(Continued)

*Primary Examiner* — Randy Gulakowski
*Assistant Examiner* — Robert Loewe
(74) *Attorney, Agent, or Firm* — Fitzpatrick, Cella, Harper & Scinto

(57) ABSTRACT

A pigment ink is provided which has good ink reliability and storage stability and can achieve superior scratch resistance of images at such a level that coloring materials are hardly scraped off even when images are scratched with finger nails under application of such strong pressure as to scratch a recording medium at its non-recorded areas. The pigment ink contains a pigment, a modified siloxane compound having a specific structure, and a polymer whose acid value and hydrogen bond parameter ($\delta h$) are specified.

18 Claims, 4 Drawing Sheets

U.S. PATENT DOCUMENTS

| | | | |
|---|---|---|---|
| 5,123,960 A | 6/1992 | Shirota et al. | 106/22 |
| 5,135,570 A | 8/1992 | Eida et al. | 106/22 |
| 5,135,571 A | 8/1992 | Shirota et al. | 106/22 |
| 5,139,573 A | 8/1992 | Yamamoto et al. | 106/22 |
| 5,141,558 A | 8/1992 | Shirota et al. | 106/22 |
| 5,151,128 A | 9/1992 | Fukushima et al. | 106/20 |
| 5,172,133 A * | 12/1992 | Suga et al. | 347/100 |
| 5,190,581 A | 3/1993 | Fukushima et al. | 106/20 D |
| 5,216,437 A | 6/1993 | Yamamoto et al. | 346/1.1 |
| 5,220,347 A | 6/1993 | Fukushima et al. | 346/1.1 |
| 5,221,333 A | 6/1993 | Shirota et al. | 106/20 D |
| 5,231,417 A | 7/1993 | Shirota et al. | 346/1.1 |
| 5,248,991 A | 9/1993 | Shirota et al. | 346/1.1 |
| 5,250,121 A | 10/1993 | Yamamoto et al. | 106/22 R |
| 5,254,157 A | 10/1993 | Koike et al. | 106/20 D |
| 5,258,066 A | 11/1993 | Kobayashi et al. | 106/22 R |
| 5,292,613 A * | 3/1994 | Sato et al. | 430/257 |
| 5,296,022 A | 3/1994 | Kobayashi et al. | 106/20 D |
| 5,329,305 A | 7/1994 | Fukushima et al. | 347/95 |
| 5,358,558 A | 10/1994 | Yamamoto et al. | 106/22 R |
| 5,427,611 A | 6/1995 | Shirota et al. | 106/22 A |
| 5,500,023 A | 3/1996 | Koike et al. | 8/499 |
| 5,515,093 A | 5/1996 | Haruta et al. | 347/101 |
| 5,540,764 A | 7/1996 | Haruta et al. | 106/20 R |
| 5,593,757 A | 1/1997 | Kashiwazaki et al. | 428/195 |
| 5,596,027 A * | 1/1997 | Mead et al. | 523/161 |
| 5,606,356 A | 2/1997 | Noguchi et al. | 347/100 |
| 5,614,007 A | 3/1997 | Kurabayashi et al. | 106/22 R |
| 5,620,793 A | 4/1997 | Suzuki et al. | |
| 5,621,447 A | 4/1997 | Takizawa et al. | 347/88 |
| 5,640,187 A | 6/1997 | Kashiwazaki et al. | 347/101 |
| 5,658,376 A | 8/1997 | Noguchi et al. | 106/31.43 |
| 5,680,165 A | 10/1997 | Takizawa et al. | 347/88 |
| 5,696,182 A | 12/1997 | Kashiwazaki et al. | 523/161 |
| 5,698,478 A | 12/1997 | Yamamoto et al. | 442/153 |
| 5,700,314 A | 12/1997 | Kurbayashi et al. | 106/31.27 |
| 5,709,950 A | 1/1998 | Burgman et al. | |
| 5,733,971 A | 3/1998 | Feldmann-Krane et al. | |
| 5,734,403 A | 3/1998 | Suga et al. | 347/101 |
| 5,764,261 A | 6/1998 | Koike et al. | 347/100 |
| 5,781,216 A | 7/1998 | Haruta et al. | 347/106 |
| 5,782,967 A | 7/1998 | Shirota et al. | 106/31.58 |
| 5,792,249 A | 8/1998 | Shirota et al. | 106/31.27 |
| 5,869,220 A | 2/1999 | Hallock et al. | |
| 5,902,387 A | 5/1999 | Suzuki et al. | 106/22 R |
| 5,913,971 A * | 6/1999 | Fujimatsu et al. | 106/31.86 |
| 5,922,625 A | 7/1999 | Haruta et al. | 442/75 |
| 5,968,244 A | 10/1999 | Ueda et al. | 106/31.86 |
| 6,036,307 A | 3/2000 | Hakamada et al. | 347/106 |
| 6,039,795 A * | 3/2000 | Fukuo et al. | 106/31.58 |
| 6,084,006 A | 7/2000 | Kashiwazaki et al. | 523/160 |
| 6,114,411 A * | 9/2000 | Nakamura et al. | 523/161 |
| 6,139,939 A | 10/2000 | Haruta et al. | 428/195 |
| 6,162,510 A | 12/2000 | Kashiwazaki et al. | 427/511 |
| 6,188,850 B1 | 2/2001 | Sakaki et al. | |
| 6,203,604 B1 | 3/2001 | Kashiwazaki et al. | 106/31.5 |
| 6,214,963 B1 | 4/2001 | Noguchi et al. | 528/71 |
| 6,221,141 B1 | 4/2001 | Takada et al. | |
| 6,221,933 B1 * | 4/2001 | Zhu et al. | 523/160 |
| 6,248,482 B1 | 6/2001 | Kashiwazaki et al. | 430/7 |
| 6,270,905 B1 | 8/2001 | Swarup et al. | |
| 6,329,060 B1 | 12/2001 | Barkac et al. | |
| 6,342,095 B1 | 1/2002 | Takizawa et al. | |
| 6,379,443 B1 * | 4/2002 | Komatsu et al. | 106/31.58 |
| 6,391,947 B1 | 5/2002 | Noguchi et al. | 524/84 |
| 6,394,597 B1 | 5/2002 | Koike et al. | 347/106 |
| 6,398,355 B1 | 6/2002 | Shirota et al. | 347/100 |
| 6,412,936 B1 | 7/2002 | Mafune et al. | 347/100 |
| 6,426,766 B1 | 7/2002 | Shirota et al. | 347/106 |
| 6,435,658 B1 | 8/2002 | Kato et al. | |
| 6,460,987 B1 | 10/2002 | Katsuragi et al. | 347/100 |
| 6,474,803 B1 | 11/2002 | Shirota et al. | 347/100 |
| 6,528,146 B2 | 3/2003 | Okuda et al. | 428/195 |
| 6,530,656 B1 | 3/2003 | Teraoka et al. | |
| 6,540,329 B1 | 4/2003 | Kaneko et al. | |
| 6,540,344 B2 | 4/2003 | Kashiwazaki et al. | 347/100 |
| 6,552,156 B2 | 4/2003 | Noguchi et al. | 528/71 |
| 6,582,070 B2 | 6/2003 | Takada et al. | |
| 6,585,366 B2 | 7/2003 | Nagata et al. | 347/101 |
| 6,586,521 B2 | 7/2003 | Blum et al. | |
| 6,619,791 B2 | 9/2003 | Tochihara et al. | 347/100 |
| 6,648,953 B2 * | 11/2003 | Yamazaki et al. | 106/31.68 |
| 6,659,601 B2 | 12/2003 | Goto et al. | 347/100 |
| 6,676,254 B2 | 1/2004 | Nagashima et al. | 347/100 |
| 6,676,738 B2 * | 1/2004 | Sano et al. | 106/31.75 |
| 6,698,876 B2 | 3/2004 | Sato et al. | 347/100 |
| 6,706,104 B2 | 3/2004 | Takuhara et al. | |
| 6,706,105 B2 | 3/2004 | Takada et al. | |
| 6,723,137 B1 | 4/2004 | Hakamada et al. | 8/549 |
| 6,729,718 B2 | 5/2004 | Goto et al. | 347/100 |
| 6,767,090 B2 * | 7/2004 | Yatake et al. | 347/100 |
| 6,779,884 B1 | 8/2004 | Ma et al. | 347/101 |
| 6,794,427 B2 | 9/2004 | Kurabayashi et al. | 523/161 |
| 6,797,764 B2 | 9/2004 | Sagiv et al. | |
| 6,827,433 B2 * | 12/2004 | Takemoto et al. | 347/100 |
| 6,846,353 B2 * | 1/2005 | Sano et al. | 106/31.6 |
| 6,848,781 B2 | 2/2005 | Ogino et al. | |
| 6,860,593 B2 | 3/2005 | Kashiwazaki et al. | 347/100 |
| 6,866,379 B2 * | 3/2005 | Yau et al. | 347/100 |
| 6,874,881 B2 | 4/2005 | Sukuki et al. | 347/100 |
| 6,877,851 B2 * | 4/2005 | Watanabe | 347/100 |
| 6,929,362 B2 | 8/2005 | Takada et al. | 347/100 |
| 6,932,465 B2 | 8/2005 | Nito et al. | 347/96 |
| 6,935,732 B2 | 8/2005 | Takada et al. | 347/96 |
| 6,976,755 B2 | 12/2005 | Sato et al. | |
| 7,005,461 B2 | 2/2006 | Sanada et al. | |
| 7,029,109 B2 | 4/2006 | Shirota et al. | 347/100 |
| 7,055,943 B2 | 6/2006 | Suzuki et al. | 347/100 |
| 7,141,105 B2 | 11/2006 | Udagawa et al. | 106/31.49 |
| 7,144,449 B2 | 12/2006 | Udagawa et al. | 106/31.15 |
| 7,148,268 B2 | 12/2006 | Zhu et al. | |
| 7,185,978 B2 | 3/2007 | Nagashima et al. | 347/100 |
| 7,195,340 B2 | 3/2007 | Nagashima et al. | 347/56 |
| 7,208,032 B2 | 4/2007 | Hakamada et al. | 106/31.27 |
| 7,276,110 B2 | 10/2007 | Tsujimura et al. | 106/31.27 |
| 7,276,112 B2 | 10/2007 | Tokuda et al. | 106/31.6 |
| 7,291,214 B2 | 11/2007 | Tsuji et al. | 106/31.8 |
| 7,291,361 B2 | 11/2007 | Ogina et al. | |
| 7,297,194 B2 | 11/2007 | Shinjo et al. | 106/31.27 |
| 7,297,203 B2 | 11/2007 | Takada et al. | 106/31.8 |
| 7,354,145 B2 | 4/2008 | Nito et al. | 347/96 |
| 7,377,631 B2 | 5/2008 | Takada et al. | |
| 2002/0017219 A1 * | 2/2002 | Yamazaki et al. | 106/31.68 |
| 2003/0018119 A1 * | 1/2003 | Frenkel et al. | 524/502 |
| 2003/0216515 A1 | 11/2003 | Swarup et al. | |
| 2003/0216516 A1 | 11/2003 | Swarup et al. | |
| 2003/0226473 A1 | 12/2003 | Ishimoto | 106/31.6 |
| 2004/0030001 A1 * | 2/2004 | Ma et al. | 523/160 |
| 2004/0035320 A1 * | 2/2004 | Sano et al. | 106/31.6 |
| 2004/0127601 A1 * | 7/2004 | Sano et al. | 523/160 |
| 2004/0141041 A1 * | 7/2004 | Tsutsumi et al. | 347/102 |
| 2004/0249061 A1 | 12/2004 | Sunkara et al. | |
| 2005/0004263 A1 * | 1/2005 | Gould et al. | 523/160 |
| 2005/0090579 A1 * | 4/2005 | Zhu et al. | 523/160 |
| 2005/0124726 A1 * | 6/2005 | Yatake et al. | 523/160 |
| 2005/0204955 A1 | 9/2005 | Nagashima et al. | 106/31.59 |
| 2005/0228069 A1 | 10/2005 | Kataoka et al. | 523/160 |
| 2005/0250869 A1 | 11/2005 | Claes et al. | |
| 2006/0007288 A1 | 1/2006 | Takada et al. | 347/100 |
| 2006/0007289 A1 | 1/2006 | Nito et al. | 347/100 |
| 2006/0089424 A1 | 4/2006 | Sanada et al. | |
| 2006/0098067 A1 | 5/2006 | Imai et al. | 347/100 |
| 2006/0098068 A1 | 5/2006 | Hakamada et al. | 347/100 |
| 2006/0103704 A1 | 5/2006 | Hakamada et al. | 347/100 |
| 2006/0122330 A1 | 6/2006 | Wu et al. | |
| 2006/0125895 A1 | 6/2006 | Nito et al. | 347/100 |
| 2006/0160923 A1 * | 7/2006 | Koganehira et al. | 523/160 |
| 2006/0173096 A1 | 8/2006 | Ota | 523/161 |
| 2007/0029522 A1 | 2/2007 | Udagawa et al. | 252/301.16 |
| 2007/0034114 A1 | 2/2007 | Udagawa et al. | 106/31.15 |
| 2007/0097155 A1 | 5/2007 | Imai et al. | 347/1 |
| 2007/0097156 A1 | 5/2007 | Udagawa et al. | 347/1 |
| 2007/0112095 A1 | 5/2007 | Moribe et al. | 523/160 |
| 2007/0134451 A1 | 6/2007 | Hakamada et al. | 428/32.38 |
| 2007/0188572 A1 | 8/2007 | Takayama et al. | 347/100 |
| 2007/0191508 A1 | 8/2007 | Nakagawa et al. | 523/160 |

FOREIGN PATENT DOCUMENTS

| | | |
|---|---|---|
| CN | 1898347 A | 1/2007 |
| EP | 0 882 770 A1 | 12/1998 |
| EP | 0 974 626 A1 | 1/2000 |
| EP | 1 153 992 A1 | 11/2001 |
| EP | 1 234 859 A1 | 8/2002 |
| JP | 2000-108495 | 4/2000 |
| JP | 2000-153677 A | 6/2000 |
| JP | 2003-170650 A | 6/2003 |
| JP | 2003-192964 | 7/2003 |
| JP | 2004-099766 A | 4/2004 |
| JP | 2004-284362 | 10/2004 |
| JP | 2005-081754 A | 3/2005 |
| JP | 2005-263969 A | 9/2005 |
| WO | WO 01/90262 A1 | 11/2001 |

OTHER PUBLICATIONS van Krevelen, Properties of Polymers, Second Edition, Chapter 7, pp. 129-159 (1976).

Apr. 29, 2010 European Search Report in European Patent Application No. 08151160.2.

Akzo Nobel, "Structuuridentificatie van siliconenadditieven", p. 49.

May 11, 2010 Chinese Official Action in Chinese Patent Application No. 200810074220.3 (with translation).

May 20, 2008 European Office Action in European Patent Appln. No. 08151151.0.

* cited by examiner

PIGMENT INK, INK JET RECORDING METHOD, INK CARTRIDGE, RECORDING UNIT AND INK JET RECORDING APPARATUS

BACKGROUND OF THE INVENTION

1. Field of the Invention

This invention relates to a pigment ink suitable for ink jet recording as well, which makes use of a pigment as a coloring material, and also relates to an ink jet recording method, an ink cartridge, a recording unit and an ink jet recording apparatus which make use of the pigment ink.

2. Description of the Related Art

In inks for ink jet recording, pigment inks, which contain pigments as coloring materials, are widely used in recent years not only in small-sized printers used for office work and domestic purposes but also in large-sized printers used for the purpose of printing posters and advertisements. In the case of printing with large-sized printers, fairly large recording mediums of, e.g., A0 size and A1 size are often used, and it is common for them to be rolled up into cylindrical shape when recording mediums on which images have been formed are carried. Hence, problems as stated below may arise.

When a recording medium is rolled up, images may be rubbed at edged portions such as corners of the recording medium. On such an occasion, images formed using pigment inks are scratched and coloring materials are scraped off. Such a problem may fairly frequently arise. Problems like this may also arise in other circumstances. For example, there is a case in which, when images formed using pigment inks are posted outdoors as posters, the images are strongly scratched with something edged such as finger nails. In such a case as well, as in the foregoing, such a problem that coloring materials are scraped off fairly frequently arises. Thus, in the case where pigment inks are employed as the inks to be used in the large-sized printers, it is an important subject to achieve scratch resistance at a strikingly higher level than ever, which is high enough for coloring materials of images not to be scraped off even when something sharp touches the images.

To cope with this matter, since the scratch resistance of the images formed using pigment inks has hitherto been a subject, various methods are proposed in order to resolve such a subject. However, most of studies involved in such proposals have been aimed at the small-sized printers used for office work and domestic purposes. Accordingly, what is the best that can be given by the use of conventional techniques alone is to achieve scratch resistance at such a level that images are not scratched upon touching the images. That is, even now, the subject of the scratch resistance of the images when the image is touched by something edged as mentioned above still has been unable to be resolved.

Of course, some proposals have been made for achieving scratch resistance of images at a higher level so that images can be provided which can satisfy the scratch resistance even under such circumstances as noted above. For example, there is a proposal concerned with an improvement in scratch resistance of images which is achieved by applying a specific compound onto images formed using an ink jet recording ink to provide the images with high slipperiness (see Japanese Patent Applications Laid-open No. 2000-108495 and No. 2004-284362; hereinafter "Patent Documents 1 and 2", respectively). There is another proposal concerned with an improvement in scratch resistance and abrasion resistance of images which is achieved by using an ink containing a specific polymer and a specific polyether modified organosiloxane (Japanese Patent Application Laid-open No. 2003-192964; hereinafter "Patent Document 3").

However, studies made by the present inventors have revealed that, where images are formed using only ink jet recording inks, the images formed do not satisfy the above scratch resistance at the strikingly high level at which the present invention is aimed, even though any of the conventional techniques as noted above is used. That is, in the conventional techniques as noted above, satisfactory images may be obtained as long as the scratch resistance is at such a level that images are not scratched when touched gently with finger nails, but scratch resistance of images at a level higher than that has been unable to be achieved. Specifically, a phenomenon occurs in which coloring materials are scraped off when images are scratched with something edged such as finger nails under application of such strong pressure as to scratch a recording medium at its non-recorded areas.

For example, the objective of the present invention may be achievable if, after images have been formed, the images are protected sufficiently by using a method in which images are protected with the so-called solid material, e.g., by spraying or covering them with a lubricating substance or a slip compound, as disclosed in Patent Documents 1 and 2. The objective of the present invention may be achieved as in the invention disclosed in Patent Documents 1 and 2, also when a laminate system or the like is used in which images are covered with a film. However, as a result of the investigation of the present inventors, as disclosed in Patent Document 1, where an ink containing a lubricating substance is used or an aqueous solution containing a lubricating substance is applied onto images, the lubricating substance penetrates into a recording medium together with an aqueous medium. As a result, the effect of improving scratch resistance that is to be brought about by applying such liquids onto images has been found to be hardly obtained. That is, with the method in which the ink containing such a substance as to merely improve scratch resistance is used or the aqueous solution containing said substance is applied onto images, the scratch resistance at which the present invention is aimed cannot be achieved. When the laminate system is employed, there is a problem that cost becomes high because a laminating treatment is conducted by another machine other than recording apparatus.

The method disclosed in Patent Document 3 also can not achieve images having the scratch resistance at a strikingly high level at which the present invention is aimed, as in the case of Patent Documents 1 and 2. More specifically, according to Patent Document 3, it is disclosed that an ink containing a specific polymer and a specific polyether-modified organosiloxane is used in order to achieve both abrasion resistance and scratch resistance. However, in the examples of the Patent Document 3, upon making a comparison between Example 1 in which the specific polyether-modified organosiloxane is contained and Comparative Example 2 in which the specific polyether-modified organosiloxane is not contained, the abrasion resistances of them are equal to each other. That is, in the invention disclosed in Patent Document 3, the polyether-modified organosiloxane in the ink penetrates into a recording medium together with an aqueous medium after the ink has been applied onto the recording medium, and hence it is indicated that the organosiloxane is not involved in the effect of improving the abrasion resistance. In other words, it can be said that the invention disclosed in Patent Document 3 suggests that the improvement of abrasion resistance depends only on the polymer.

On the other hand, in regard to the scratch resistance of images, the effect attributable to the polyether-modified organosiloxane is somewhat seen. However, taking into account the fact that the scratch resistance is abruptly improved when a certain time has lapsed after the images have been formed, it can be said that the effect of improving the scratch resistance also depends primarily on the polymer. As a result of studies made by the present inventors, in the case of only the performance of such a water-soluble polymer as used in ink jet recording inks, the binding force between a recording medium, a polymer and a pigment depends only on the strength of the polymer. Hence, it was found that however much the polymer is contained in the ink, only scratch resistance is achievable which is at such a level that the images on the recording medium are not scratched when touched gently with finger nails. Especially where the content of the pigment solid matter in the ink is 1.2% by mass or less based on the total mass of the ink, the solid matter that functions as filler is so small that the high scratch resistance at which the present invention is aimed cannot be achieved by only the polymer. That is, also in the invention disclosed in Patent Document 3, in which the scratch resistance is improved relying only on the performance of the polymer, the scratch resistance is at a level classified as conventional one, and does not at all reach the level of scratch resistance at which the present invention is aimed.

In addition, the ink disclosed in Patent Document 3 can be said to be not so suitable for an ink jet recording ink. The polymer used in the invention described in Patent Document 3, which has an extremely low acid value, is very low in solubility in an aqueous medium. Hence, when the ink is prepared, such a polymer must be dissolved at a fairly high temperature of 100° C. or more. This is impractical for an ink used in common ink jet recording methods. Besides, as in the ink disclosed in Patent Document 3, when applying to an ink jet method an ink the film forming properties of which is rapidly improved with a lapse of time after being ejected, the ink may dry in nozzles to cause faulty ejection when left standing in the state that the ink is not ejected for a certain time. Further, where such an ink is ejected by a thermal-type ink jet recording method, stable ejection property is difficult to maintain because the polymer has too low an acid value. Taking these into account, it can be said to be difficult to utilize the technique disclosed in Patent Document 3 to improve the scratch resistance of images.

SUMMARY OF THE INVENTION

Accordingly, an object of the present invention is to provide a pigment ink which can satisfy ink ejection property such as anti-stick quality and ink reliability such as storage stability so as to be applicable to ink jet recording as well, and at the same time, can form images having scratch resistance at a high level which has not been achieved by prior art. Specifically, the present invention is to provide a pigment ink which can form images having scratch resistance at such a high level that coloring materials are hardly scraped off even when images are scratched with finger nails under application of such strong pressure as to scratch a recording medium at its non-recorded areas.

Another object of the present invention is to provide an ink jet recording method, an ink cartridge, a recording unit and an ink jet recording apparatus which make use of the pigment ink having such a high-level scratch resistance.

The above objects can be achieved by the present invention described below. That is, the pigment ink according to the present invention is a pigment ink containing at least a pigment, a modified siloxane compound and a polymer, wherein the modified siloxane compound is at least one selected from the group consisting of a modified siloxane compound represented by the following Formula (1), a modified siloxane compound represented by the following Formula (2) and a modified siloxane compound represented by the following Formula (3), and the polymer is at least one polymer selected from the group consisting of a polymer A which has an acid value of from 90 mgKOH/g or more to 150 mgKOH/g or less and in which the hydrogen bond parameter (δh) of the polymer that is obtained by the solubility parameters of monomers constituting the polymer is from $1.0\,\text{cal}^{0.5}/\text{cm}^{1.5}$ or more to $3.7\,\text{cal}^{0.5}/\text{cm}^{1.5}$ or less, and a polymer B which has an acid value of from more than 150 mgKOH/g to 200 mgKOH/g or less and in which the hydrogen bond parameter (δh) of the polymer that is obtained by the solubility parameters of monomers constituting the polymer is from $1.0\,\text{cal}^{0.5}/\text{cm}^{1.5}$ or more to $1.5\,\text{cal}^{0.5}/\text{cm}^{1.5}$ or less.

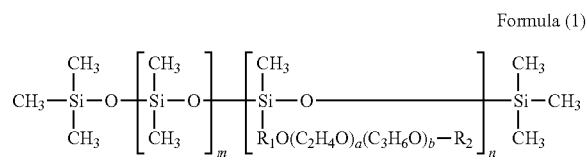

Formula (1)

where the modified siloxane compound represented by Formula (1) has a weight average molecular weight of from 8,000 or more to 30,000 or less; in Formula (1), $R_1$ is an alkylene group having 1 to 20 carbon atom(s), $R_2$ is a hydrogen atom or an alkyl group having 1 to 20 carbon atom(s), m is from 1 or more to 250 or less, n is from 1 or more to 100 or less, a is from 1 or more to 100 or less, and b is from 0 or more to 100 or less.

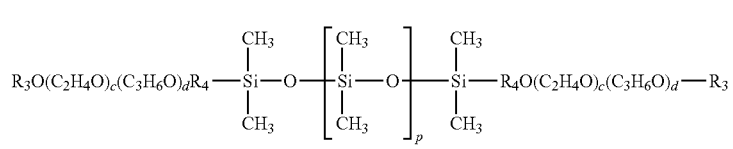

Formula (2)

where the modified siloxane compound represented by Formula (2) has a weight average molecular weight of from 8,000 or more to less than 50,000; in Formula (2), $R_3$'s are each independently a hydrogen atom or an alkyl group having 1 to 20 carbon atom(s), $R_4$'s are each independently an alkylene group having 1 to 20 carbon atom(s), p is from 1 or more to 450 or less, c is from 1 or more to 250 or less, and d is from 0 or more to 100 or less.

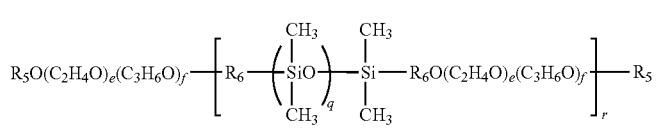

where the modified siloxane compound represented by Formula (3) has a weight average molecular weight of from 8,000 or more to less than 50,000 and an HLB of from 1 or more to less than 7; in Formula (3), $R_5$'s are each independently a hydrogen atom or an alkyl group having 1 to 20 carbon atom(s), $R_6$ is an alkylene group having 1 to 20 carbon atom(s), q is from 1 or more to 100 or less, r is from 1 or more to 100 or less, e is from 1 or more to 100 or less, and f is from 0 or more to 100 or less.

The ink jet recording method according to another embodiment of the present invention is an ink jet recording method in which an ink is ejected by ink jet method to perform recording on a recording medium, characterized in that the above pigment ink is used as the ink.

The ink cartridge according to still another embodiment of the present invention is an ink cartridge having an ink storing portion which stores an ink therein, characterized in that the ink stored in the ink storing portion is the above pigment ink.

The recording unit according to a further embodiment of the present invention is a recording unit having an ink storing portion which stores an ink therein and a recording head which ejects the ink therefrom, characterized in that the ink stored in the ink storing portion is the above pigment ink.

The ink jet recording apparatus according to a still further embodiment of the present invention is an ink jet recording apparatus having an ink storing portion which stores an ink therein and a recording head which ejects the ink therefrom, characterized in that the ink stored in the ink storing portion is the above pigment ink.

The pigment ink according to a still further embodiment of the present invention is a pigment ink containing at least a pigment, a modified siloxane compound and a polymer, wherein the modified siloxane compound is at least one selected from the group consisting of a modified siloxane compound represented by the above Formula (1), a modified siloxane compound represented by the above Formula (2) and a modified siloxane compound represented by the above Formula (3), and a coefficient of dynamic friction of reference evaluation images formed using the pigment ink is 0.40 or less.

According to the present invention, a pigment ink is provided which can satisfy ink ejection property and storage stability so as to be preferably usable for ink jet recording as well, and can form images having superior scratch resistance at a much higher level than the scratch resistance at which the prior art has been aimed. Specifically, the images formed using this ink can have scratch resistance at such a high level that coloring materials are hardly scraped off even when images are scratched with finger nails under application of such strong pressure as to scratch a recording medium at its non-recorded areas.

According to the other embodiments of the present invention, an ink jet recording method, an ink cartridge, a recording unit and an ink jet recording apparatus are provided which can stably form images having such a strikingly high scratch resistance as stated above.

Further features of the present invention will become apparent from the following description of exemplary embodiments with reference to the accompanying drawings.

DESCRIPTION OF THE EMBODIMENTS

The present invention is described below in detail by giving preferred embodiments. The largest point of the present invention is that, in virtue of the pigment ink (hereinafter simply "ink" in some cases) that is so made up as to contain a specific polymer described below and a specific modified siloxane compound, the surfaces of images formed using such an ink are made slippery. As a result of making the surfaces of images slippery, the scratch resistance of the images can strikingly be improved as compared with images formed using any conventional inks. That is, the present invention has been made on the basis of a new idea of taking also note of the frictional force acting between images and a substance coming into contact with the images, differently from the idea that the scratch resistance of images is improved by utilizing only the film forming properties of a polymer forming the images, as in conventional techniques. Thus, according to the present invention, images can be provided in which not only coloring materials of images are not scraped off but also scratch marks hardly remain even when the images are scratched with finger nails under application of such strong pressure as to scratch a recording medium at its non-recorded areas.

Figure 1:
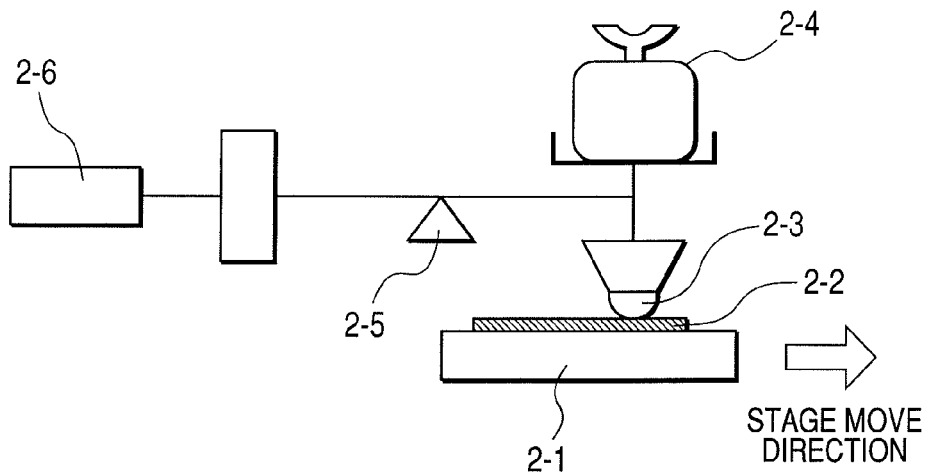
FIG. 1 is a diagrammatic view showing the concept of a scratch resistance test.

As a result of studies made by the present inventors, it has been found that the frictional force acting between images and materials (e.g., finger nails) coming into touch with the images, in other words, the slipperiness of image surfaces can be expressed by using a coefficient of dynamic friction as an index. The coefficient of dynamic friction may be measured in the following way by using a scratch resistance tester. FIG. 1 presents a diagrammatic view for illustrating a scratch resistance test.

In the test, a polymethyl methacrylate (PMMA) ball is used as a rubbing material 2-3 which causes scratches in a state close to scratches made by finger nails. Then, a surface property tester (trade name: HEIDON TRIBOGEAR Type 14DR, manufactured by Shinto Kagaku K.K.) is used to cause scratches in the following way. Specifically, as shown in FIG. 1, a PMMA ball to which a load is kept applied from above is vertically brought into touch with image surfaces, where a sample 2-2 placed on a working stage 2-1 is moved at a given speed to cause scratches.

The mass of a metal fitting for fastening the rubbing material 2-3 is kept removed with a balance mechanism 2-5. Then, the scratch resistance of images is evaluated by a vertical load (a weight 2-4) applied to the image surfaces. The horizontal-direction force acting on the rubbing material 2-3 when the stage is moved can be measured through a load cell 2-6 connected with the metal fitting. The coefficient of dynamic friction of image surfaces against the rubbing material can be measured from the ratio of horizontal-direction force to vertical-load force at the time of movement.

The present inventors have conducted the scratch resistance test in such a manner as described above over various images, to make detailed studies. As a result, it has been found that, where images are formed on a recording medium having a coat layer, the images can satisfy the high-level scratch resistance at which the present invention is aimed, as long as the coefficient of dynamic friction of images is 0.40 or less, more preferably less than 0.35, and particularly preferably 0.30 or less. The lower limit of the coefficient of dynamic friction is 0.00 or more.

The course is described through which the present inventors have come up with the constitution of the present invention in which the ink containing the specific polymer described below and the specific modified siloxane compound is used in order to cause images to have the coefficient of dynamic friction of 0.40 or less. To achieve the above object of the present invention, the present inventors have studied several kinds of inks containing several kinds of modified siloxane compounds which are conventionally deemed to be effective in improving the slipperiness of coating film surfaces. However, as a result of making a comparison between the coefficient of dynamic friction of images formed using an ink containing any of the above-noted specific modified siloxane compounds and the coefficient of dynamic friction of images formed using an ink not containing any of the above-noted modified siloxane compounds, it has been found that there is no difference in the values of the coefficient of dynamic friction. That is, the coefficient of dynamic friction at which the present invention is aimed has been found to be not achievable at all and the scratch resistance cannot be sufficiently achieved even when using the ink containing any of the modified siloxane compounds the present inventors have studied. It is not clear why no change in the coefficient of dynamic friction comes about on the images formed, even though the inks containing the modified siloxane compounds which are conventionally deemed to be effective in improving the slipperiness of coating film surfaces are used. However, the present inventors presume that the reason is as follows: As stated previously, the modified siloxane compound present in the ink penetrates into the recording medium together with an aqueous medium present in the ink, and hence the recording medium is brought into such a state that no modified siloxane compound is present on its surface.

Accordingly, the present inventors have studied how to cause most of the modified siloxane compound in the ink to remain on the surface of the recording medium. Then, the present inventors have first thought about utilizing the synergistic effect of the properties of the modified siloxane compound and the properties of the polymer. As a result, they have considered that one of the following two constitutions is most suitable for achieving the object of the present invention, and have proceeded with their studies. One constitution is such that a polymer having properties of becoming fixed on the recording medium to form a film is incorporated in the ink to thereby cause numberless gaps present in an ink-receiving layer to clog up to prevent the modified siloxane compound from penetrating into the recording medium. The other constitution is such that the properties of the modified siloxane compound high in hydrophobicity are utilized so that the modified siloxane compound is adsorbed by the pigment or polymer to be present on the recording medium together with the polymer.

First, the present inventors have made studies on the polymer that is a factor common to the above two constitutions. In this case, they have considered that the polymer capable of achieving the object of the present invention is required to have properties of causing solid-liquid separation immediately after the ink has been applied onto the recording medium, to become fixed on the recording medium together with the pigment. Accordingly, they have proceeded with the studies with a focus on the selection of polymers having such properties. As a result, they have come to the conclusion that, as a polymer capable of becoming fixed on the recording medium to form a film having certain high strength, at least one polymer selected from a polymer A and a polymer B having the following properties is most suitable. The polymer A is a polymer which has an acid value of from 90 mgKOH/g or more to 150 mgKOH/g or less and in which the hydrogen bond parameter ($\delta$h) of the polymer obtained by the solubility parameters of monomers constituting the polymer is at least 3.7 cal$^{0.5}$/cm$^{1.5}$ or less. The polymer B is a polymer which has an acid value of from more than 150 mgKOH/g to 200 mgKOH/g or less and in which the hydrogen bond parameter ($\delta$h) of polymer obtained by the solubility parameters of monomers constituting the polymer is at least 1.5 cal$^{0.5}$/cm$^{1.5}$ or less. The hydrogen bond parameter ($\delta$h) is the value obtained by the solubility parameters inherent in monomers constituting the polymer. This will be described later.

The polymer usable as a constituent of the ink of the present invention is by no means limited to the polymer A and polymer B described above. That is, the polymer contained together with the specific modified siloxane compound in the ink is sufficient if only it can achieve the high-level scratch resistance at which the present invention is aimed when being incorporated in the ink to form images. Specifically, the polymer is one capable of bringing about solid-liquid separation immediately after the ink has been applied onto the recording medium, becoming fixed on the recording medium together with the pigment. Further, the polymer used in the present invention is one which can provide the coefficient of dynamic friction of 0.40 or less for reference evaluation images formed using the ink containing both the polymer and the specific modified siloxane compound detailed later. That is, any polymer may be used as a constituent of the ink of the present invention as long as it can remain on the recording medium after the ink has been applied onto the recording medium, to form a film having certain strength. Furthermore, the polymer particularly preferably used in the ink of the present invention is one having such properties and also having properties of adsorbing the specific modified siloxane compound to improve the slipperiness of images which is detailed later and is essential for achieving the object of the present invention. The "reference evaluation images" referred to in the present invention means images recorded using the ink containing both the polymer and the specific modified siloxane compound under the following conditions. That is, the term refers to images formed under the conditions of an ejection quantity of from 3 ng to 5 ng per ink droplet, a resolution of 1,200 dpi×1,200 dpi, 8-pass bi-directional recording and a recording duty of 100%.

The present inventors have next formed images by using the ink containing the polymer having the above properties and the modified siloxane compound studied as above, to examine the scratch resistance of the images formed. As a result, it has been found that the coefficient of dynamic friction of the images is 0.40 or less, and thus, by using together with the specific modified siloxane compound, images can be obtained which have much higher scratch resistance than the scratch resistance of images formed using an ink containing only the polymer having the above properties.

The foregoing results have led to the best constitution of the present invention, i.e., the ink containing both at least one polymer selected from the polymer A and the polymer B each having the above properties and the specific modified siloxane compound. More specifically, at least one polymer selected from the polymer A and the polymer B is used having the property described below. The polymer A is a polymer which has an acid value of from 90 mgKOH/g or more to 150 mgKOH/g or less and in which the hydrogen bond parameter ($\delta h$) of the polymer that is obtained by the solubility parameters of monomers constituting the polymer is from $1.0\, cal^{0.5}/cm^{1.5}$ or more to $3.7\, cal^{0.5}/cm^{1.5}$ or less. The polymer B is a polymer which has an acid value of from more than 150 mgKOH/g to 200 mgKOH/g or less and in which the hydrogen bond parameter ($\delta h$) of the polymer that is obtained by the solubility parameters of monomers constituting the polymer is from $1.0\, cal^{0.5}/cm^{1.5}$ or more to $1.5\, cal^{0.5}/cm^{1.5}$ or less. The is obtained by the solubility parameters of monomers constituting the polymer is set to be $1.0\, cal^{0.5}/cm^{1.5}$ will be described later.

The present inventors have studied various modified siloxane compounds. As a result, they have discovered that modified siloxane compounds shown below are necessary to be used in order to achieve the scratch resistance at which the present invention is aimed. Specifically, they have discovered that what is most suitable is at least one selected from the group consisting of a modified siloxane compound represented by the following Formula (1), a modified siloxane compound represented by the following Formula (2) and a modified siloxane compound represented by the following Formula (3). These modified siloxane compounds are those which provide the reference evaluation images with the coefficient of dynamic friction of 0.40 or less obtained by the test method described above where the ink further containing the polymer is used to form images on, for example, the recording medium having a coat layer. Incidentally, the coefficient of dynamic friction of the reference evaluation images is the value obtained according to the above method.

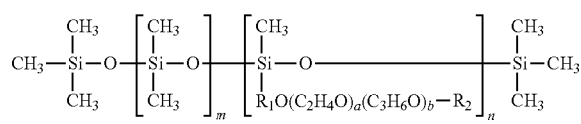

Formula (1)

where the modified siloxane compound represented by Formula (1) has a weight average molecular weight of from 8,000 or more to 30,000 or less; in Formula (1), $R_1$ is an alkylene group having 1 to 20 carbon atom(s), $R_2$ is a hydrogen atom or an alkyl group having 1 to 20 carbon atom(s), m is from 1 or more to 250 or less, n is from 1 or more to 100 or less, a is from 1 or more to 100 or less, and b is from 0 or more to 100 or less.

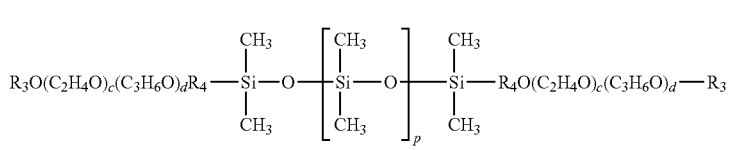

Formula (2)

use of the ink thus made up enables the modified siloxane compound to be present on the recording medium, so that the action of the modified siloxane compound on improving the slipperiness of the coating film surface can fully be brought out to achieve the superior scratch resistance. Incidentally, the reason why, for the polymer A and the polymer B, the lower limit of the hydrogen bond parameter ($\delta h$) of the polymer that where the modified siloxane compound represented by Formula (2) has a weight average molecular weight of from 8,000 or more to less than 50,000; in Formula (2), $R_3$'s are each independently a hydrogen atom or an alkyl group having 1 to 20 carbon atom(s), $R_4$'s are each independently an alkylene group having 1 to 20 carbon atom(s), p is from 1 or more to 450 or less, c is from 1 or more to 250 or less, and d is from 0 or more to 100 or less.

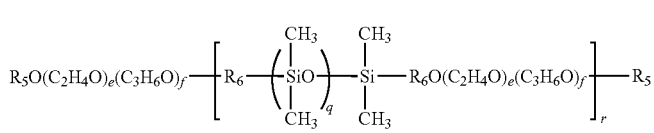

Formula (3)

where the modified siloxane compound represented by Formula (3) has a weight average molecular weight of from 8,000 or more to less than 50,000 and an HLB of from 1 or more to less than 7; in Formula (3), $R_5$'s are each independently a hydrogen atom or an alkyl group having 1 to 20 carbon atom(s), $R_6$ is an alkylene group having 1 to 20 carbon atom(s), q is from 1 or more to 100 or less, r is from 1 or more to 100 or less, e is from 1 or more to 100 or less, and f is from 0 or more to 100 or less.

The foregoing results mean that the optimum effect of the present invention can not necessarily be obtained in some cases even in the case of modified siloxane compounds having the effect of improving the slipperiness of coating film surfaces. That is, when images are formed using, e.g., an ink containing a modified siloxane compound having the value of weight average molecular weight outside the above range, the properties the modified siloxane compound originally has can not sufficiently be obtained in some cases. The reason therefor is not clear, but is presumed to be as follows: As the mechanism by which the object of the present invention is achieved, the polymer is considered to adsorb the modified siloxane compound (or vice versa), as stated previously. However, where, e.g., the modified siloxane compound represented by the above Formula (1) has a weight average molecular weight of more than 30,000, it is considered to be difficult for the polymer to adsorb the modified siloxane compound (or vice versa) in some cases because of an influence of steric hindrance or the like. Where, e.g., the modified siloxane compound represented by the above Formula (2) or (3) has a weight average molecular weight of 50,000 or more, it is considered to be difficult for the polymer to adsorb the modified siloxane compound (or vice versa) in some cases because of an influence of steric hindrance or the like. As a result, it is presumable that such a modified siloxane compound penetrates into the recording medium, so that the coefficient of dynamic friction of images can not be lowered in some cases. On the other hand, where the modified siloxane compound represented by any one of the above Formulas (1), (2) and (3) has a weight average molecular weight of less than 8,000, it is presumable that the modified siloxane compound to be provided on the surfaces of images may be in so small quantity that the coefficient of dynamic friction of images can not be lowered in some cases; or where the modified siloxane compound has a weight average molecular weight of less than 8,000, it is presumable that the modified siloxane compound itself penetrates into the recording medium, so that the scratch resistance of images can not be lowered in some cases.

Hereinafter, the "hydrogen bond parameter ($\delta h$) of a polymer that is obtained by the solubility parameters of monomers constituting the polymer", as used in the present invention, will be explained. First, the solubility parameter will be explained. The solubility parameter is affected by a functional group kind of the compound. The solubility parameter is one of the factors determining a solubility of plural compounds or an affinity of the compounds with each other, and when the solubility parameters of these compounds are similar to each other, the solubility of them is tend to become higher. The solubility parameter is classified into a dispersion force parameter ($\delta d$) resulting from the primary deviation of an electron distribution, a polarity parameter ($\delta p$) resulting from an attractive or repulsive force generated by a dipolar moment, and a hydrogen bond parameter ($\delta h$) resulting from a hydrogen bond generated by active hydrogens or a lone pair of electrons. In the present invention, the hydrogen bond parameter is applied to a polymer, and as the hydrogen bond parameter of the polymer is large, the affinity of the polymer and water become stronger. The hydrogen bond parameter ($\delta h$) of the polymer can be determined by the solubility parameters of a monomer constituting the polymer. Then, the hydrogen bond parameter ($\delta h$) of the polymer obtained by the solubility parameter of a monomer constituting the polymer can be determined by an atomic group summation method proposed by Krevelen in which organic molecules are treated as atomic groups (see Krevelen, Properties of Polymer 2nd Edition, New York, 154 (1976)). This method is described below. First, the dispersion force parameter ($\delta d$), polarity parameter ($\delta p$), and hydrogen bond parameter ($\delta h$) of the solubility parameter are determined from a dispersion force parameter Fdi per mole, a polarity force parameter Fpi per mole, and a hydrogen bond force parameter Fhi per mole of each atomic group in the organic molecules. The solubility parameter ($\delta$) can be determined by using those values as shown in the following equations:

$$\delta d = (\Sigma F di)/V.$$

$$\delta p = (\Sigma F pi)/V.$$

$$\delta h = (\Sigma F hi)/V.$$

$$\delta = (\delta d^2 + \delta p^2 + \delta h^2)^{1/2}$$

(V is the sum of molar volumes of atomic groups.)

The present inventors have come to a finding that, as to a polymer contained in the ink, it is possible to judge whether the polymer penetrates into a recording medium together with an aqueous medium or remains on the recording medium to become fixed taking into account the hydrogen bond term ($\delta h$) that contributes to the solubility parameter ($\delta$). The relationship between the hydrogen bond parameter ($\delta h$) that contributes to the solubility parameter ($\delta$) and the degree of penetration of polymer into the recording medium is not clear, but is presumes to be as follows: The hydrogen bond parameter ($\delta h$) comes from hydrogen bonds, and there is a tendency that the affinity between the polymer and water increases with an increase in the hydrogen bond parameter ($\delta h$) of the polymer. For example, an ink primarily containing an aqueous medium as in an ink jet recording ink has a tendency that, with an increase in the hydrogen bond parameter ($\delta h$), the polymer becomes more hydrated and the agglomerative properties between polymers become lower. Based on this tendency, the polymer is increasingly apt to penetrate into the recording medium without agglomerating on the recording medium, so that the proportion of the polymer remaining on the recording medium tends to lower.

According to studies made by the present inventors, it is preferable that the polymer A and/or the polymer B, having the value(s) of the hydrogen bond parameter ($\delta h$) of polymer that is obtained by the solubility parameters of monomers constituting the polymer, is/are used as a constituent(s) of the ink, which value(s) may differ in its preferable range depending on the acid value of the polymer. More specifically, between the polymer (polymer A) having an acid value of from 90 mgKOH/g or more to 150 mgKOH/g or less and the polymer (polymer B) having an acid value of from more than 150 mgKOH/g to 200 mgKOH/g or less, the preferable range of the hydrogen bond parameter ($\delta h$) differs as shown below. In the case of the polymer A having the acid value within the above range, the value of the hydrogen bond parameter ($\delta h$) of polymer that is obtained by the solubility parameters of monomers constituting the polymer is preferably from 1.0 cal$^{0.5}$/cm$^{1.5}$ or more to 3.7 cal$^{0.5}$/cm$^{1.5}$ or less. In the case of the polymer B, the value of the hydrogen bond parameter ($\delta h$) of polymer that is obtained by the solubility parameters of monomers constituting the polymer is preferably from 1.0 cal$^{0.5}$/cm$^{1.5}$ or more to 1.5 cal$^{0.5}$/cm$^{1.5}$ or less. Thus, the polymer capable of achieving the effect of the present invention can accurately be selected.

—Pigment Ink—

The respective components constituting the pigment ink of the present invention are described below.

Modified Siloxane Compound

The modified siloxane compound used in the ink of the present invention is at least one selected from the group consisting of the modified siloxane compound represented by the following Formula (1), the modified siloxane compound represented by the following Formula (2) and the modified siloxane compound represented by the following Formula (3).

In these modified siloxane compounds represented by the following Formulas (1), (2) and (3), ($C_2H_4O$) and ($C_3H_6O$) represent an ethylene oxide unit and a propylene oxide unit, respectively. In each modified siloxane compound, the ethylene oxide unit and the propylene oxide unit in the structure of the compound may be present in any state such as a random form or a block form. In the present invention, these units are preferably present in a random form or a block form. That these units are present in the state of a random form means that the ethylene oxide unit and the propylene oxide unit are irregularly arranged. That these units are present in the state of a block form means that the respective blocks are each made up of some units and the blocks thus made up are regularly arranged.

Modified siloxane compound represented by Formula (1)

Formula (1)

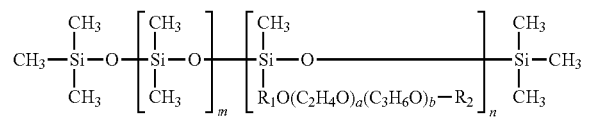

where the modified siloxane compound represented by Formula (1) has a weight average molecular weight of from 8,000 or more to 30,000 or less; in Formula (1), $R_1$ is an alkylene group having 1 to 20 carbon atom(s), $R_2$ is a hydrogen atom or an alkyl group having 1 to 20 carbon atom(s), m is from 1 or more to 250 or less, n is from 1 or more to 100 or less, a is from 1 or more to 100 or less, and b is from 0 or more to 100 or less.

$R_1$ is preferably an alkylene group having 1 to 10 carbon atom(s), and further, particularly preferably an ethylene group, a propylene group or a butylene group. $R_2$ is preferably an alkyl group having 1 to 10 carbon atom(s), and further, particularly preferably an ethyl group or a propyl group. Letter symbol m is preferably from 1 or more to 250 or less, more preferably from 1 or more to 100 or less, and particularly preferably from 1 or more to 50 or less. Letter symbol n is preferably from 1 or more to 100 or less, and more preferably from 1 or more to 50 or less. Letter symbol a is preferably from 1 or more to 100 or less, and more preferably from 1 or more to 50 or less. Letter symbol b is preferably from 0 or more to 100 or less, and more preferably from 1 or more to 50 or less.

The compound represented by above Formula (1) used in the present invention is obtained by the additive polymerization of two kinds of compounds represented by the following formulas. Namely, the compound is obtained by the additive reaction of polysiloxane having n unit(s) of hydrogen atom(s) bonded to n unit(s) of Si and compounds of a structure having ethylene oxide unit(s) and/or propylene oxide unit(s) and an alkene group on the terminal of the compound. Specifically, the compound is obtained by the addition of the hydrogen atom of the polysiloxane with the alkene group. In the following Formulae, m is from 1 or more to 250 or less, n is from 1 or more to 100 or less, a is from 1 or more to 100 or less, b is from 0 or more to 100 or less and R is an alkene group having 1 to 20 carbon atom(s).

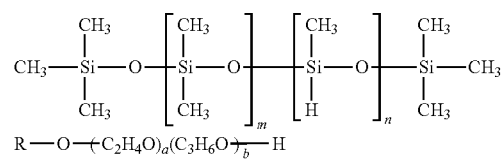

Modified siloxane compound represented by Formula (2)

Formula (2)

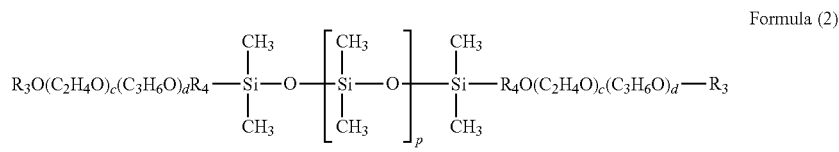

where the modified siloxane compound represented by Formula (2) has a weight average molecular weight of from 8,000 or more to less than 50,000 in Formula (2), $R_3$'s are each independently a hydrogen atom or an alkyl group having 1 to 20 carbon atom(s), $R_4$'s are each independently an alkylene group having 1 to 20 carbon atom(s), p is from 1 or more to 450 or less, c is from 1 or more to 250 or less, and d is from 0 or more to 100 or less.

$R_3$'s are each preferably a hydrogen atom or an alkyl group having 1 to 10 carbon atom(s), and more preferably a hydrogen atom, an ethyl group or a propyl group. $R_4$'s are each preferably an alkylene group having 1 to 10 carbon atom(s), and further, particularly preferably an ethylene group, a propylene group or a butylene group. Letter symbol p is preferably from 1 or more to 450 or less, more preferably from 1 or more to 100 or less, and particularly preferably from 1 or more to 50 or less.

The compound represented by above Formula (2) used in the present invention is obtained by the additive polymerization of two kinds of compounds represented by the following formulas. Namely, the compound is obtained by the additive reaction of polysiloxane having hydrogen atoms bonded to Si on both terminals and compounds of a structure having ethylene oxide unit(s) and/or propylene oxide unit(s) and an alkene group on the terminal of the compound. Specifically, the compound is obtained by the addition of the hydrogen atom of the polysiloxane with the alkene group. In the following Formulae, p is from 1 or more to 450 or less, c is from 1 or more to 250 or less, d is from 0 or more to 100 or less and R is an alkene group having 1 to 20 carbon atom(s).

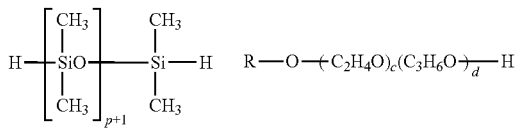

Modified siloxane compound represented by Formula (3)

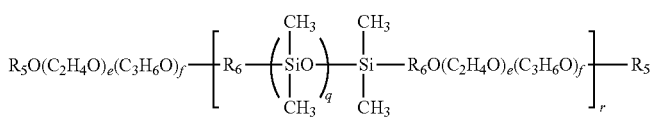

Formula (3)

where the modified siloxane compound represented by Formula (3) has a weight average molecular weight of from 8,000 or more to less than 50,000 and an HLB of from 1 or more to less than 7; in Formula (3), $R_5$'s are each independently a hydrogen atom or an alkyl group having 1 to 20 carbon atom(s), $R_6$ is an alkylene group having 1 to 20 carbon atom(s), q is from 1 or more to 100 or less, r is from 1 or more to 100 or less, e is from 1 or more to 100 or less, and f is from 0 or more to 100 or less.

$R_5$'s are each preferably a hydrogen atom or an alkyl group having 1 to 10 carbon atom(s), and more preferably a hydrogen atom, an ethyl group or a propyl group. $R_6$'s are each preferably an alkylene group having 1 to 10 carbon atom(s), and further, particularly preferably an ethylene group, a propylene group or a butylene group. Letter symbol e is preferably from 1 or more to 100 or less, and more preferably from 1 or more to 50 or less. Letter symbol f is preferably from 1 or more to 100 or less, and more preferably from 1 or more to 50 or less.

The compound represented by above Formula (3) used in the present invention is obtained by the additive polymerization of two kinds of compounds represented by the following formulas. Namely, the compound is obtained by the additive reaction of polysiloxane having hydrogen atoms bonded to Si on both terminals and compounds of a structure having ethylene oxide unit(s) and/or propylene oxide unit(s) and alkene groups on both terminals of the compound. Specifically, the compound is obtained by the addition of the hydrogen atom of the polysiloxane with the alkene group. In the following Formulae, q is from 1 or more to 100 or less, r is from 1 or more to 100 or less, e is from 1 or more to 100 or less, f is from 0 or more to 100 or less and R is an alkene group having 1 to 20 carbon atom(s).

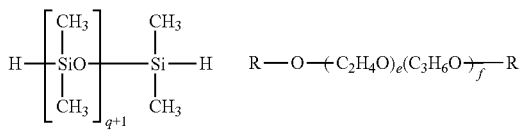

As at least one modified siloxane compound selected from the group consisting of the modified siloxane compounds represented by the above Formulas (1), (2) and (3), any compound may be used as long as images are obtainable which have the high-level scratch resistance at which the present invention is aimed. However, studies made by the present inventors have revealed that it is particularly preferable to use modified siloxane compounds having the following weight average molecular weights. Specifically, in the case of the modified siloxane compound represented by the above Formula (1), it has preferably a weight average molecular weight (Mw) of from 8,000 or more to 30,000 or less, and further, particularly preferably from 8,500 or more to 30,000 or less. In the case of the modified siloxane compound represented by the above Formula (2) or (3), it has preferably a weight average molecular weight (Mw) of from 8,000 or more to less than 50,000, and further, particularly preferably from 8,500 or more to 30,000 or less. Here, the weight average molecular weight (Mw) is weight average molecular weight in terms of polystyrene in molecular weight distribution as measured by gel permeation chromatography (GPC). Incidentally, the modified siloxane compounds used in the present invention are synthesized as described above, since the compounds having alkene group(s) as well as polysilixanes used as raw materials are mixture compounds having molecular weight ranges, the molecular weight of the compounds are obtained as average molecular weights.

Studies made by the present inventors have revealed that, in the modified siloxane compound represented by the above Formula (1), it is preferable to use a modified siloxane compound having a specific HLB (hydrophilic-lipophilic balance; the value calculated by the Griffin method). More specifically, the modified siloxane compound represented by the above Formula (1) may preferably have an HLB of from 1 or more to 11 or less, and more preferably from 5 or more to 11 or less.

Where the modified siloxane compound represented by the above Formula (1) is used in the ink of the present invention, setting its weight average molecular weight and its HLB within the above ranges reduces the modified siloxane compound penetrating into the recording medium when the ink is applied onto the recording medium. As a result, the modified siloxane compound represented by the above Formula (1) is apt to remain on the recording medium. Hence, even where the modified siloxane compound represented by the above Formula (1) is in a small content in the ink, the coefficient of dynamic friction of images can effectively be lowered. Such a modified siloxane compound represented by the above Formula (1) that fulfills the above conditions and is preferably usable in the present invention may include the following: e.g., FZ-2104, FZ-2130 and FZ-2191 (available from Dow Corning Toray Silicone Co., Ltd.), KF-615A (available from Shin-Etsu Chemical Co., Ltd.), TSF4452 (available from GE Toshiba Silicone Co., Ltd.). Of course, in the present invention, examples are by no means limited to these.

Where the modified siloxane compound represented by the above Formula (2) is used in the ink of the present invention, setting its weight average molecular weight within the above range reduces the modified siloxane compound penetrating into the recording medium when the ink is applied onto the recording medium. As a result, the modified siloxane compound represented by the above Formula (2) is apt to remain on the recording medium. Hence, even where the modified siloxane compound represented by the above Formula (2) is in a small content in the ink, the coefficient of dynamic friction of images can effectively be lowered. Such a modified siloxane compound represented by the above Formula (2) that fulfills the above conditions and is preferably usable in the present invention may include, e.g., BYK333 (available from Byk Chemie Japan KK). Of course, in the present invention, examples are by no means limited thereto.

Studies made by the present inventors have revealed that, of the modified siloxane compound represented by the above Formula (3), it is preferable to use a modified siloxane compound having a specific HLB (hydrophilic-lipophilic balance; the value calculated by the Griffin method). More specifically, the modified siloxane compound represented by the above Formula (3) necessarily has an HLB of 1 or more and less than 7.

Where the modified siloxane compound represented by the above Formula (3) is used in the ink of the present invention, setting its weight average molecular weight and its HLB within the above ranges makes the modified siloxane compound less penetrate into the recording medium when the ink is applied onto the recording medium. As a result, the modified siloxane compound represented by the above Formula (3) is apt to remain on the recording medium. Hence, even where the modified siloxane compound represented by the above Formula (3) is in a small content in the ink, the coefficient of dynamic friction of images can effectively be lowered. Such a modified siloxane compound represented by the above Formula (1) that fulfills the above conditions and is preferably usable in the present invention may include the following: e.g., FZ-2203, FZ-2207, FZ-2222 and FZ-2231 (available from Dow Corning Toray Silicone Co., Ltd.). Of course, in the present invention, examples are by no means limited to these.

As described previously, the weight average molecular weight (Mw) of the modified siloxane compound may be measured by gel permeation chromatography (GPC) using tetrahydrofuran as a mobile phase. A measuring method used in the present invention is as shown below. Measuring conditions such as a filter, columns, a standard polystyrene sample and its molecular weight are by no means limited to the following.

First, a sample for measurement is put in tetrahydrofuran (THF) and left standing for several hours to dissolve to prepare a solution. Thereafter, the solution is filtered with a solvent-resistant membrane filter of 0.45 μm in pore size (e.g.; trade name: TITAN 2 Syringe Filter, PTFE, 0.45 μm; available from SUN-SRi). The concentration of the sample in the sample solution is so controlled that the content of the modified siloxane compound is from 0.1% by mass to 0.5% by mass.

In the GPC, an RI detector (refractive index detector) is used. In order to accurately measure molecular weight within the range of from 1,000 to 2,000,000, it is preferable to use a plurality of commercially available polystyrene gel columns in combination. For example, four columns of Shodex KF-806M (available from Showa Denko K.K.) may be used in combination, or something corresponding thereto may be used. THF as a mobile phase is flowed at a flow rate of 1 mL/min into columns having been stabilized in a 40.0° C. heat chamber, and the above sample solution is injected in an amount of about 0.1 mL.

The weight average molecular weight of the sample is determined by using a molecular weight calibration curve having been prepared using the standard polystyrene sample. One having a molecular weight of from about 100 to about 10,000,000 (e.g., one available from Polymer Laboratories Inc.) may be used as the standard polystyrene sample, and it is suitable to use at least about 10 types of standard polystyrene samples.

The content (% by mass) of the modified siloxane compound in the ink is preferably from 0.2% by mass or more to 5.0% by mass or less, and more preferably from 0.5% by mass or more to less than 3.0% by mass, based on the total mass of the ink. In particular, when the modified siloxane compound represented by the above Formula (2) is used, the content (% by mass) of the modified siloxane compound in the ink is preferably from 1.0% by mass or more to less than 3.0% by mass. Where the content of the modified siloxane compound is from 0.5% by mass or more, the modified siloxane compound can satisfactorily be left on the recording medium to provide images with especially superior scratch resistance. In addition, where the content of the modified siloxane compound is less than 3.0% by mass, the occurrence of faulty ejection due to, e.g., kogation can be preferably minimized.

Polymer

As stated previously, in the ink of the present invention, any polymer may be used as long as it is a polymer which can remain on the recording medium after the ink has been applied onto the recording medium, and form a film having strength to a certain extent. However, studies made by the present inventors have revealed that, in order to suppress an ejection orifice wetting phenomenon due to the polymer, which particularly comes into question when the ink is used for ink jet recording, it is most suitable to use at least one of the polymer A and the polymer B each having the properties as described previously.

The "hydrogen bond parameter (δh) of polymer that is obtained by the solubility parameters of monomers constituting the polymer", as used in the present invention, is a value found in the following way. First, the hydrogen bond parameter (δh) of each monomer constituting the polymer is obtained by the solubility parameter inherent in each monomer constituting the polymer. Then, the hydrogen bond parameter (δh) of each monomer constituting the polymer obtained above is multiplied by the compositional (mass) ratio of each monomer constituting the polymer (compositional ratio when the sum total is defined as 1) to find respective values. Next, the resulting values are summed up to find the hydrogen bond parameter (δh) of the polymer.

If the polymer making up the ink of the present invention has an acid value of less than 90 mgKOH/g, the polymer may be unable to be dissolved in an alkali, or the polymer may be precipitated when the ink is stored for a long period of time. Further, if it has an acid value of less than 90 mgKOH/g, it may be difficult to maintain stable ejection property when the ink is incorporated with the polymer in an amount large enough to achieve the scratch resistance at which the present invention is aimed and is ejected by means of a thermal-type ink jet recording system. Hence, it is preferable for the polymer to have an acid value of 90 mgKOH/g or more. On the other hand, if the polymer has an acid value of more than 150 mgKOH/g, the polymer may tend to penetrate into the recording medium together with an aqueous medium contained in the ink, so that the high-level scratch resistance at which the present invention is aimed can not be obtained in some cases. Accordingly, when the polymer has an acid value of more than 150 mgKOH/g, it is preferable that the hydrogen bond parameter (δh) of polymer that is obtained by the solubility parameters of monomers constituting the polymer is 1.5 cal$^{0.5}$/cm$^{1.5}$ or less. However, when the polymer has an acid value of more than 200 mgKOH/g, even though the hydrogen bond parameter (δh) is controlled in any manner, the polymer can not be left, in some cases, on the recording medium in an amount large enough to achieve the high-level scratch resistance at which the present invention is aimed. Hence, it is preferable that the polymer has an acid value of 200 mgKOH/g or less.

Further, the polymer A or polymer B making up the ink of the present invention may remarkably cause the ejection orifice wetting phenomenon due to the polymer, if the hydrogen bond parameter (δh) of polymer that is obtained by the solubility parameters of monomers constituting the polymer is less than 1.0 cal$^{0.5}$/cm$^{1.5}$. As a result, for example, curved flying of ink droplets may occur to cause deterioration in ejection property. Hence, the hydrogen bond parameter (δh) of polymer that is obtained by the solubility parameters of monomers constituting the polymer A or polymer B is preferably 1.0 cal$^{0.5}$/cm$^{1.5}$ or more. On the other hand, when the hydrogen bond parameter (δh) of polymer that is obtained by the solubility parameters of monomers constituting the polymer is more than 3.7 cal$^{0.5}$/cm$^{1.5}$, even though the acid value of the polymer is controlled in any manner, the polymer may be liable to penetrate into the recording medium together with an aqueous medium contained in the ink. Hence, the scratch resistance at which the present invention is aimed can not be obtained in some cases.

To summarize these, it is most suitable for at least one polymer selected from the polymer A and the polymer B, making up the ink of the present invention, to have such properties that the acid value and hydrogen bond parameter (δh) as specified below are in combination.

The polymer A has an acid value of from 90 mgKOH/g or more to 150 mgKOH/g or less. In the polymer A, in addition to the above acid value, the hydrogen bond parameter (δh) of polymer that is obtained by the solubility parameters of monomers constituting the polymer is from 1.0 cal$^{0.5}$/cm$^{1.5}$ or more to 3.7 cal$^{0.5}$/cm$^{1.5}$ or less. Further, in the polymer A, the hydrogen bond parameter (δh) of polymer that is obtained by the solubility parameters of monomers constituting the polymer is more preferably from 1.0 cal$^{0.5}$/cm$^{1.5}$ or more to 3.2 cal$^{0.5}$/cm$^{1.5}$ or less. In particular, in the polymer A, the hydrogen bond parameter (δh) of polymer that is obtained by the solubility parameters of monomers constituting the polymer is still further preferably from 1.2 cal$^{0.5}$/cm$^{1.5}$ or more to 1.8 cal$^{0.5}$/cm$^{1.5}$ or less.

On the other hand, the polymer B has an acid value of from more than 150 mgKOH/g to 200 mgKOH/g or less. In the polymer B, in addition to the above acid value, the hydrogen bond parameter (δh) of polymer that is obtained by the solubility parameters of monomers constituting the polymer is from 1.0 cal$^{0.5}$/cm$^{1.5}$ or more to 1.5 cal$^{0.5}$/cm$^{1.5}$ or less. Further, in the polymer B, the hydrogen bond parameter (δh) of polymer that is obtained by the solubility parameters of monomers constituting the polymer is more preferably from 1.2 cal$^{0.5}$/cm$^{1.5}$ or more to 1.5 cal$^{0.5}$/cm$^{1.5}$ or less.

As the monomer(s) making up the polymer used in the ink of the present invention, any monomer may be used as long as it can provide the polymer having the acid value and the hydrogen bond parameter (δh) of polymer that is obtained by the solubility parameters of monomers constituting the polymer, as described above. Specifically, monomers enumerated below may be used as the monomer making up the polymer.

Styrene, and α-methylstyrene; ethyl acrylate, n-butyl acrylate, n-hexyl acrylate, methyl methacrylate, and benzyl methacrylate; monomers having a carboxyl group, such as acrylic acid, methacrylic acid, crotonic acid, ethacrylic acid, propylacrylic acid, isopropylacrylic acid, itaconic acid, and fumaric acid; monomers having a sulfonic acid group, such as styrene sulfonic acid, sulfonic acid-2-propyl acrylamide, acrylic acid-2-ethyl sulfonate, methacrylic acid-2-ethyl sulfonate, and butyl acrylamide sulfonic acid; and monomers having a phosphonic acid group, such as methacrylic acid-2-ethyl phosphonate, and acrylic acid-2-ethyl phosphonate.

In the present invention, in the case when the polymer A is used, it may preferably contain, among the monomers enumerated above, at least one monomer selected from the group consisting of styrene, n-butyl acrylate and benzyl methacrylate. Further, the monomer(s) making up the polymer A may more preferably have both styrene and n-butyl acrylate. In the monomers making up the polymer A, the mass ratio of n-butyl acrylate to styrene (n-butyl acrylate/styrene) is particularly preferably from more than 0.2 to less than 0.35. In the case when the polymer B is used, it may preferably contain, among the monomers enumerated above, at least one monomer selected from the group consisting of styrene and α-methylstyrene. Further, the monomer(s) making up the polymer B may more preferably have both styrene and α-methylstyrene. In the monomers making up the polymer B, the mass ratio of α-methylstyrene to styrene (α-methylstyrene/styrene) is particularly preferably 0.90 or less. In the present invention, it is not so desirable to use a monomer having a nonionic group, such as ethylene oxide, because the strength of a film formed on the recording medium may be lessened.

The polymer (at least one polymer selected from the polymer A and the polymer B) may preferably have a weight average molecular weight of from 5,000 or more to 15,000 or less, and more preferably from 6,000 or more to 9,000 or less. The polymer having weight average molecular weight within the above range can easily remain on the recording medium after the ink has been applied onto the recording medium, and further can not easily be affected by steric hindrance. Hence, the polymer can easily adsorb the modified siloxane compound, so that the coefficient of dynamic friction of images can effectively be lowered.

The content (% by mass) of the polymer (at least one polymer selected from the polymer A and the polymer B) in the ink is preferably from 0.5% by mass or more to 5.0% by mass or less, and more preferably from 2.5% by mass or more to 4.0% by mass or less, based on the total mass of the ink. Inasmuch as the content of the polymer is within the above range, the polymer can be left on the recording medium in such an amount that the scratch resistance of images can satisfactorily be achieved. Further, inasmuch as the content of the polymer is within the above range, the ejection orifice wetting phenomenon due to the polymer can be suppressed and deterioration in ejection property, such as curved flying of ink droplets, is not easily brought about.

Further, where the ink of the present invention is applied onto a recording medium having a coat layer, the pigment in the ink is present in the state that agglomerates are formed on the recording medium, without penetrating into the recording medium. In this case, the polymer is left on the recording medium in an amount large enough to include the agglomerates, whereby the scratch resistance of images can be effectively improved. Accordingly, the content (% by mass) of the polymer (at least one polymer selected from the polymer A and the polymer B) in the ink is preferably at least 1.2 times as much as the content (% by mass) of the pigment (polymer/pigment). Especially where the content (% by mass) of the pigment in the ink is 0.1% by mass or more, or further 0.3% by mass or more, to less than 1.2% by mass based on the total mass of the ink, the content of the polymer is particularly preferably at least 3.0 times as much as the content (% by mass) of the pigment. In addition, the content (% by mass) of the polymer in the ink is preferably 10.0 times or more as much as the content (% by mass) of the pigment (polymer/pigment).

The polymer described above may also be used as a dispersing agent (a dispersing polymer). In the present invention, however, it is preferable that the polymer used as a dispersing agent is one other than the polymers described above. In this case, any dispersing agent may be used as long as it is applicable to commonly available ink jet recording inks. Monomers making up the dispersing agent may specifically include the following, and polymers each composed of at least two of these monomers may be cited. At least one monomer is preferably a hydrophilic monomer. Such monomers may include styrene, vinyl naphthalene, aliphatic alcohol esters of α,β-ethylenically unsaturated carboxylic acids, acrylic acid, maleic acid, itaconic acid, fumaric acid, vinyl acetate, vinyl pyrrolidone, acrylamide, and derivatives of these. The polymers may be in any form including a block copolymer, a random copolymer, a graft copolymer or a salt of any of these. Further, natural polymers, such as rosin, shellac and starch, are usable. These polymers are soluble in an aqueous solution in which a base has been dissolved, and are of an alkali-soluble type.

Pigment

In the ink of the present invention, it is possible to use pigments of a polymer dispersion type (polymer dispersion type pigments) which use a dispersing agent to disperse the pigment, and pigments of a self-dispersion type (self-dispersion type pigments) in which hydrophilic groups have been introduced into the pigment particle surface portions. It is also possible to use pigments having organic groups containing a polymer which are chemically bonded to the pigment particle surfaces (polymer-bonded self-dispersion type pigments), and microcapsule type pigments whose dispersibility is improved so as to render them dispersible without using any dispersing agent. Of course, these pigments different in the manner of dispersion may be used in combination. The content (% by mass) of the pigment in the ink is preferably from 0.1% by mass or more to 15.0% by mass or less, and more preferably from 1.0% by mass or more to 10.0% by mass or less, based on the total mass of the ink.

It is preferable to use, as a pigment for a black ink, carbon black such as furnace black, lamp black, acetylene black or channel black. Specifically, the following commercially available products may be used, for example: RAVEN: 1170, 1190 ULTRA-II, 1200, 1250, 1255, 1500, 2000, 3500, 5000 ULTRA, 5250, 5750 and 700 (the foregoing are available from Columbian Carbon Japan Limited); BLACK PEARLS L, REGAL: 330R, 400R and 660R, MOGUL L, MONARCH: 700, 800, 880, 900, 1000, 1100, 1300, 1400 and 2000, and VALCAN XC-72 (the foregoing are available from Cabot Corp.); COLOR BLACK: FW1, FW2, FW2V, FW18, FW200, S150, S160 and S170, PRINTEX: 35, U, V, 140U and 140V, SPECIAL BLACK: 6, 5, 4A and 4 (the foregoing are available from Degussa Corp.); and No. 25, No. 33, No. 40, No. 47, No. 52, No. 900, No. 2300, MCF-88, MA600, MA7, MA8, and MA100 (the foregoing are available from Mitsubishi Chemicals, Inc.).

Carbon black prepared newly may also be used. Of course, in the present invention, examples are by no means limited to these, and any conventionally known carbon black may be used. Without being limited to carbon black, fine magnetic-material particles of magnetite, ferrite or the like, and titanium black may also be used as the pigment.

In color inks, organic pigments may preferably be used as pigments. Specifically, the following may be used, for example: Water-insoluble azo pigments such as Toluidine Red, Toluidine maroon, Hanza Yellow, Benzidine Yellow and Pyrazolone Red; water-soluble azo pigments such as Lithol Red, Helio Bordeaux, Pigment Scarlet and Permanent Red 2B; derivatives from vat dyes, such as alizarin, indanthrone and Thioindigo maroon; phthalocyanine type pigments such as Phthalocyanine Blue and Phthalocyanine Green; quinacridone type pigments such as Quinacridone Red and Quinacridone Magenta; perylene type pigments such as Perylene Red and Perylene Scarlet; isoindolinone type pigments such as Isoindolinone Yellow and Isoindolinone Orange; imidazolone type pigments such as Benzimidazolone Yellow, Benzimidazolone Orange and Benzimidazolone Red; pyranthrone type pigments such as Pyranthrone Red and Pyranthrone Orange; and indigo type pigments, condensation azo type pigments, thioindigo type pigments, diketopyrrolopyrrole type pigments, Flavanthrone Yellow, Acyl Amide Yellow, Quinophthalone Yellow, Nickel Azo Yellow, Copper Azomethine Yellow, Perinone Orange, Anthrone Orange, Dianthraquinonyl Red, and Dioxazine Violet. Of course, in the present invention, examples are by no means limited to these.

When organic pigments are shown by Color Index (C.I.) Number, the following may be used, for example: C.I. Pigment Yellow: 12, 13, 14, 17, 20, 24, 74, 83, 86, 93, 97, 109, 110, 117, 120, 125, 128, 137, 138, 147, 148, 150, 151, 153, 154, 166, 168, 180, 185, etc.; C.I. Pigment Orange: 16, 36, 43, 51, 55, 59, 61, 71, etc.; C.I. Pigment Red: 9, 48, 49, 52, 53, 57, 97, 122, 123, 149, 168, 175, 176, 177, 180, 192, 215, 216, 217, 220, 223, 224, 226, 227, 228, 238, 240, 254, 255, 272, etc.; C.I. Pigment Violet: 19, 23, 29, 30, 37, 40, 50, etc.; C.I. Pigment Blue: 15, 15:1, 15:3, 15:4, 15:6, 22, 60, 64, etc.; C.I. Pigment Green: 7, 36, etc.; and C.I. Pigment Brown: 23, 25, 26, etc. Of course, in the present invention, examples are by no means limited to these.

Aqueous Medium

In the ink of the present invention, an aqueous medium may be used which is water or a mixed solvent of water and a water-soluble organic solvent. The content (% by mass) of the water-soluble organic solvent in the ink is preferably from 3.0% by mass or more to 50.0% by mass or less based on the total mass of the ink.

There are no particular limitations on the water-soluble organic solvent, as long as it is water-soluble. Such solvents as enumerated below may be used alone or in combination. Specifically, the following water-soluble organic solvents may be used, for example: alkanediols such as 1,3-butanediol, 1,5-pentanediol, 1,2-hexanediol and 1,6-hexanediol; glycol ethers such as diethylene glycol monomethyl(or -ethyl) ether and triethylene glycol monoethyl(or -butyl) ether; alkyl alcohols having 1 to 4 carbon atoms, such as ethanol, isopropanol, n-butanol, isobutanol, secondary butanol and tertiary butanol; carboxylic acid amides such as N,N-dimethyl formamide and N,N-dimethyl acetamide; ketones or ketoalcohols such as acetone, methyl ethyl ketone and 2-methyl-2-hydroxypentan-4-one; cyclic ethers such as tetrahydrofuran and dioxane; glycerol; ethylene glycols such as ethylene glycol, diethylene glycol, triethylene glycol and tetraethylene glycol; polyethylene glycols having an average molecular weight of from 200 to 1,000, such as 1,2- or 1,3-propylene glycol and 1,2- or 1,4-butylene glycol; glycols such as thiodiglycol, 1,2,6-hexanetriol, and acetylene glycol derivatives; heterocyclic rings such as 2-pyrrolidone, N-methyl-2-pyrrolidone, 1,3-diemthyl-2-imidazolidinone and N-methylmorpholine; and sulfur-containing compounds such as dimethyl sulfoxide.

As the water, it is preferable to use deionized water (ion-exchange water). The content (% by mass) of the water in the ink is preferably from 50.0% by mass or more to 95.0% by mass or less based on the total mass of the ink.

Other Components

Besides the components described above, the ink of the present invention may contain a moisture-retentive solid matter such as urea, a urea derivative, trimethylolpropane or trimethylolethane. The content (% by mass) of the moisture-retentive solid matter in ink is preferably from 0.1% by mass or more to 20.0% by mass or less, and more preferably from 3.0% by mass or more to 10.0% by mass or less, based on the total mass of the ink.

In order to cause the ink to have desired values of physical properties as needed, the ink may further contain various additives such as a pH adjuster, a rust preventive, an antiseptic agent, a mildew-proofing agent, an antioxidant and a reduction-preventive agent.

—Ink Set—

The ink of the present invention can be used in combination with another ink(s) as an ink set.

—Ink Jet Recording Method—

The ink of the present invention is particularly preferably used in an ink jet recording method in which the ink is ejected by means of an ink jet method. The ink jet recording method includes, e.g., a recording method in which mechanical energy is caused to act on an ink to eject the ink, and a recording method in which heat energy is caused to act on an ink to eject the ink. In particular, the ink of the present invention is preferably used in the recording method using heat energy.

—Ink Cartridge—

The ink cartridge of the present invention is provided with an ink storing portion which stores an ink therein, and is characterized in that the ink stored in the ink storing portion is the above ink of the present invention.

—Recording Unit—

The recording unit of the present invention is provided with an ink storing portion which stores an ink therein and a recording head which ejects the ink therefrom, and is characterized in that the ink stored in the ink storing portion is the above ink of the present invention. In particular, it is preferably a recording unit in which the recording head ejects the ink therefrom by causing heat energy to act on the ink.

—Ink Jet Recording Apparatus—

The ink jet recording apparatus of the present invention is provided with an ink storing portion which stores an ink therein and a recording head which ejects the ink therefrom, and is characterized in that the ink stored in the ink storing portion is the above ink of the present invention. In particular, it is preferably an ink jet recording apparatus in which the recording head ejects the ink by causing heat energy to act on the ink.

Figure 2:
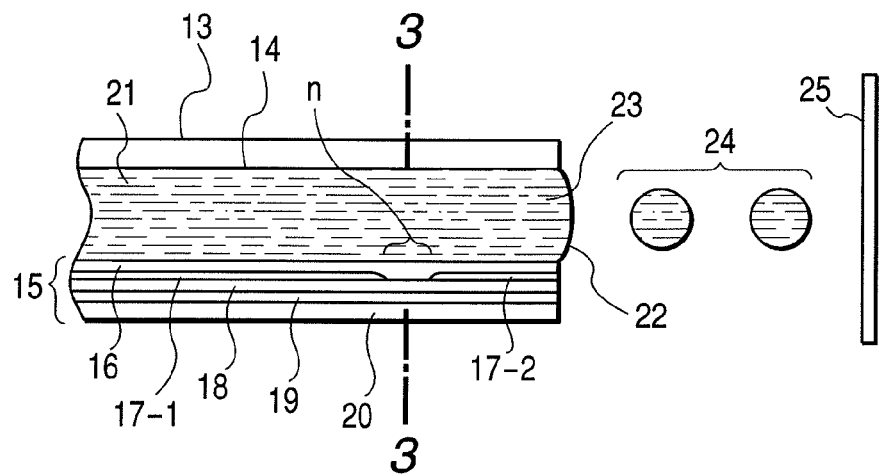
FIG. 2 is a longitudinal sectional view of a recording head.
Figure 3:
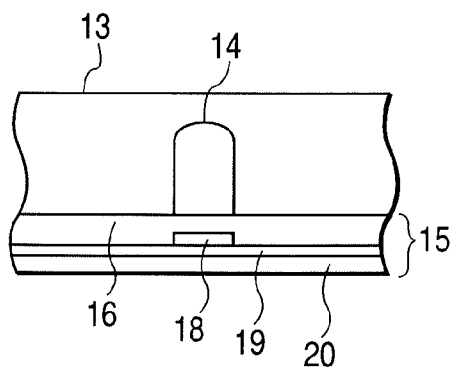
FIG. 3 is a transverse sectional view of the above recording head.

An example of the ink jet recording apparatus is described below with reference to the drawings. First, an example of the configuration of the recording head, which is the main part of the ink jet recording apparatus utilizing heat energy, is shown in FIGS. 2 and 3. FIG. 2 is a cross-sectional view of a recording head 13 along its ink channel, and FIG. 3 is a cross-sectional view taken along the line 3-3 of FIG. 2. The recording head 13 is composed of a member having an ink channel (nozzle) 14, and a heating element substrate member 15. The heating element substrate member 15 is composed of a protective layer 16, electrodes 17-1 and 17-2, a heating resistor layer 18, a heat accumulating layer 19 and a substrate 20.

Upon applying pulsewise electric signals to the electrodes 17-1 and 17-2 of the recording head 13, heat is abruptly generated at the region denoted by n in the heating element substrate member 15, so that bubbles are generated in ink 21 in contact with the surface of this region. Then, the pressure of the bubbles thrusts out a meniscus 23 and the ink 21 is ejected from an ejection orifice 22 of the nozzle 14 in the form of ink droplets 24 to fly toward a recording medium 25.

Figure 4:
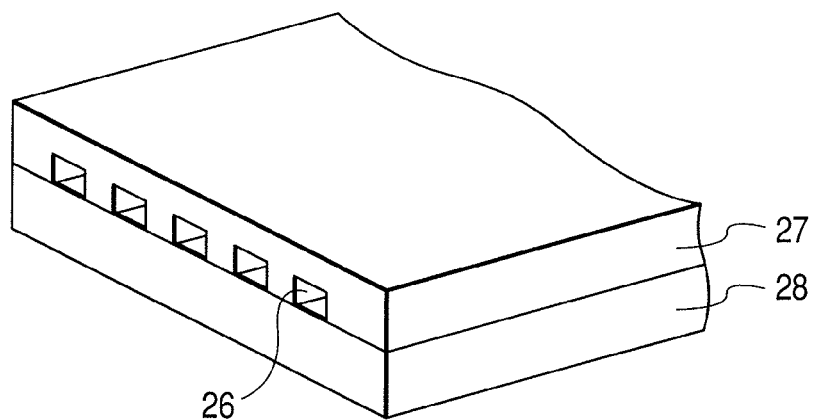
FIG. 4 is a perspective view of a recording head in which multiple recording heads each of which is the recording head as shown in FIG. 2 are set.

FIG. 4 illustrates the external appearance of an example of a multi-head in which multiple recording heads each of which is the recording head as shown in FIG. 2, are arranged. The multi-head is composed of a glass plate 27 having a multi-nozzle 26, and a recording head similar to what is illustrated in FIG. 2.

Figure 5:
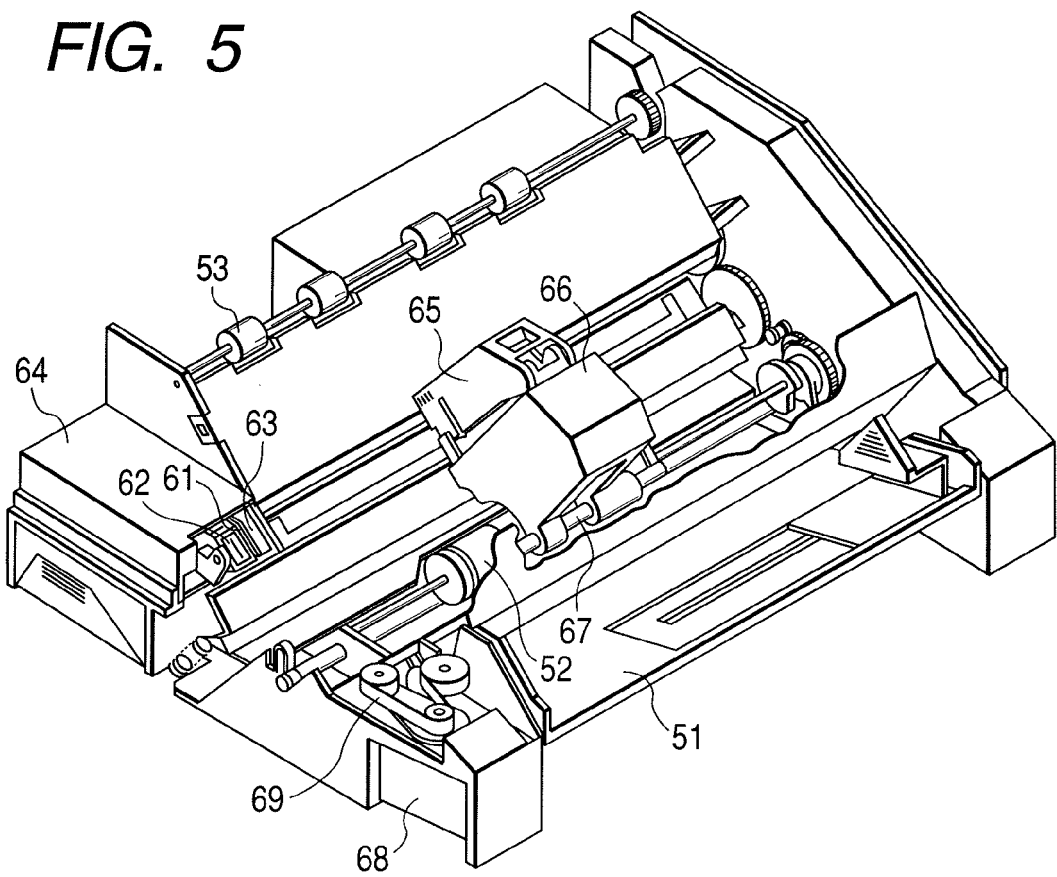
FIG. 5 is a perspective view showing an example of an ink-jet recording apparatus.

FIG. 5 is a perspective view showing an example of an ink jet recording apparatus in which the recording head has been incorporated. A blade 61 is a wiping member, one end of which is retained by a blade-retaining member and which is in the form of a cantilever. The blade 61 is provided at the position adjacent to the region in which a recording head 65 performs recording, and is retained in such a form as to project into the course through which the recording head 65 is moved.

Reference numeral 62 denotes a cap for the face of ejection orifices of the recording head 65, which is disposed at the home position adjacent to the blade 61, and is so set up that it moves in the direction perpendicular to the direction of movement of the recording head 65, and comes into contact with the face of ejection orifices to carry out capping. Reference numeral 63 denotes an ink absorber provided adjacently to the blade 61, and like the blade 61, is retained in such a form as to project into the course through which the recording head 65 is moved. An ejection restoration assembly 64 is made up of the blade 61, the cap 62 and the ink absorber 63. The blade 61 and the ink absorber 63 remove water and dust from the ejection orifice face.

Reference numeral 65 denotes the recording head which has an ejection energy generating means and ejects the ink to a recording medium set opposite to the ejection orifice face provided with ejection orifices, performing recording. Reference numeral 66 denotes a carriage on which the recording head 65 is mounted so that the recording head 65 can be moved. The carriage 66 is slidably associated with a guide shaft 67. Part of the carriage 66 is connected (not shown) with a belt 69 driven by a motor 68. Thus, the carriage 66 can be moved along the guide shaft 67 and hence the recording head 65 can be moved from a recording region to a region adjacent thereto.

Reference numeral 51 denotes a paper feeding part from which recording mediums are inserted, and reference numeral 52 denotes a paper feed roller driven by a motor (not shown). With such make-up, the recording medium is fed to the position opposite to the ejection orifice face of the recording head 65, and with the progress of recording, discharged to a paper delivery section provided with a paper delivery roller 53. The cap 62 of the ejection restoration assembly 64 recedes from the moving course of the recording head 65 when the recording head 65 returns to its home position after completion of recording, while the blade 61 projects into the moving course. Thus, the ejection orifice face of the recording head 65 is wiped.

When the cap 62 comes into contact with the ejection orifice face of the recording head 65 to carry out capping, the cap 62 is moved in such a manner as to project into the moving course of the recording head. When the recording head 65 is moved from its home position to the position at which the recording is started, the cap 62 and the blade 61 are present at the same position as the above position where the ejection orifice face is wiped. As a result, the ejection orifice face of the recording head 65 is wiped also at the time of this movement. The movement of the recording head to its home position is performed not only when recording is completed or ejection is restored, but also when the recording head is moved over recording regions for the purpose of recording, during which the recording head is moved to the home position adjacent to each recording region at given intervals, where the ejection orifice face is wiped also in conjunction with this movement.

Figure 6:
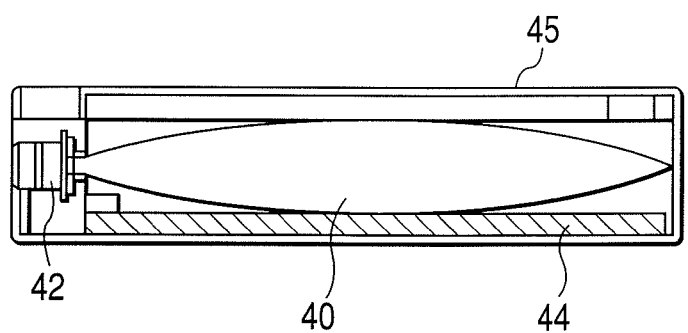
FIG. 6 is a longitudinal sectional view of an ink cartridge.

FIG. 6 is a view showing an example of an ink cartridge 45 that stores the ink being fed to the recording head through an ink-feeding member, e.g., a tube. Here, reference numeral 40 denotes an ink storing portion, e.g., an ink bag, having stored therein the feeding ink. The top thereof is provided with a stopper 42 made of rubber. A needle (not shown) may be inserted into this stopper 42 so that the ink in the ink bag 40 can be fed to the head. Reference numeral 44 denotes an absorber that receives a waste ink.

Figure 7:
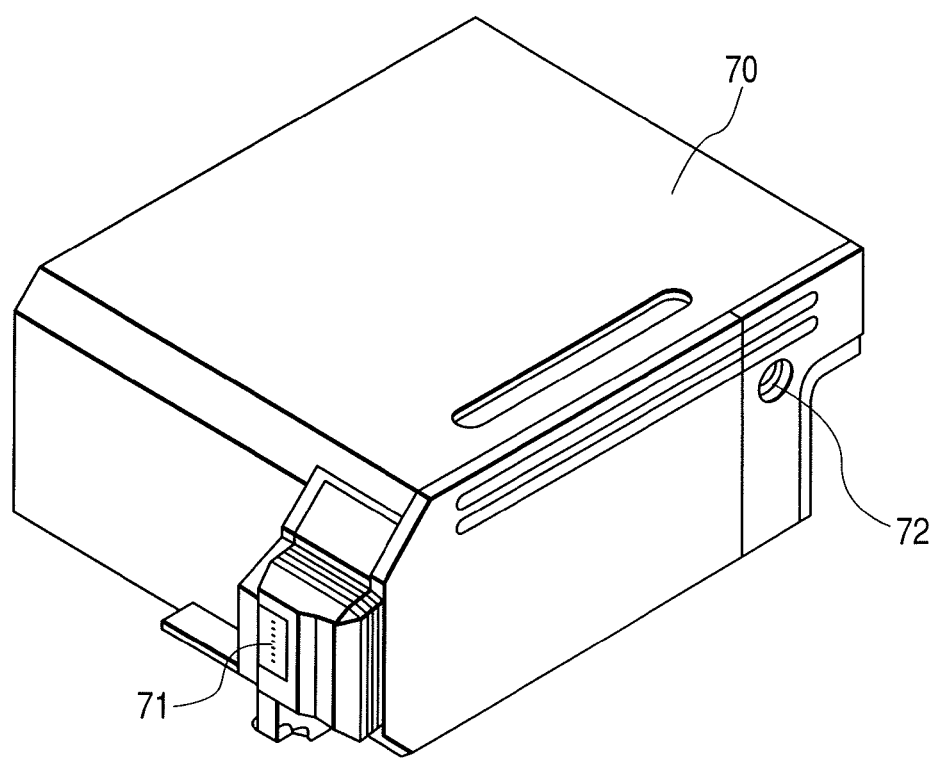
FIG. 7 is a perspective view showing an example of a recording unit.

In the present invention, without being limited to the recording unit in which the recording head and the ink cartridge are separated, a recording unit is also preferably usable in which these are integrally formed as shown in FIG. 7. In FIG. 7, reference numeral 70 denotes a recording unit, in the interior of which an ink storing portion that has stored an ink, e.g., an ink absorber, is stored, where the ink in such an ink absorber is ejected in the form of ink droplets from a recording head 71 having a plurality of orifices. In place of the ink absorber, the recording unit may be so set up that the ink storing portion is an ink bag provided internally with a spring or the like. Reference numeral 72 denotes an air path opening through which the interior of the cartridge is communicated with the atmosphere. This recording unit 70 is used in place of the recording head 65 shown in FIG. 5, and is detachably mountable to the carriage 66.

Next, an ink-jet recording apparatus which utilizes mechanical energy will be described. This apparatus is characterized by having a recording head which is provided with a nozzle-formed substrate having a plurality of nozzles, a pressure generating device composed of a piezoelectric material and a conductive material, and an ink with which the surrounding of the pressure generating device is filled, and in which the pressure generating device is distorted by an applied voltage to eject ink droplets from the nozzles.

Figure 8:
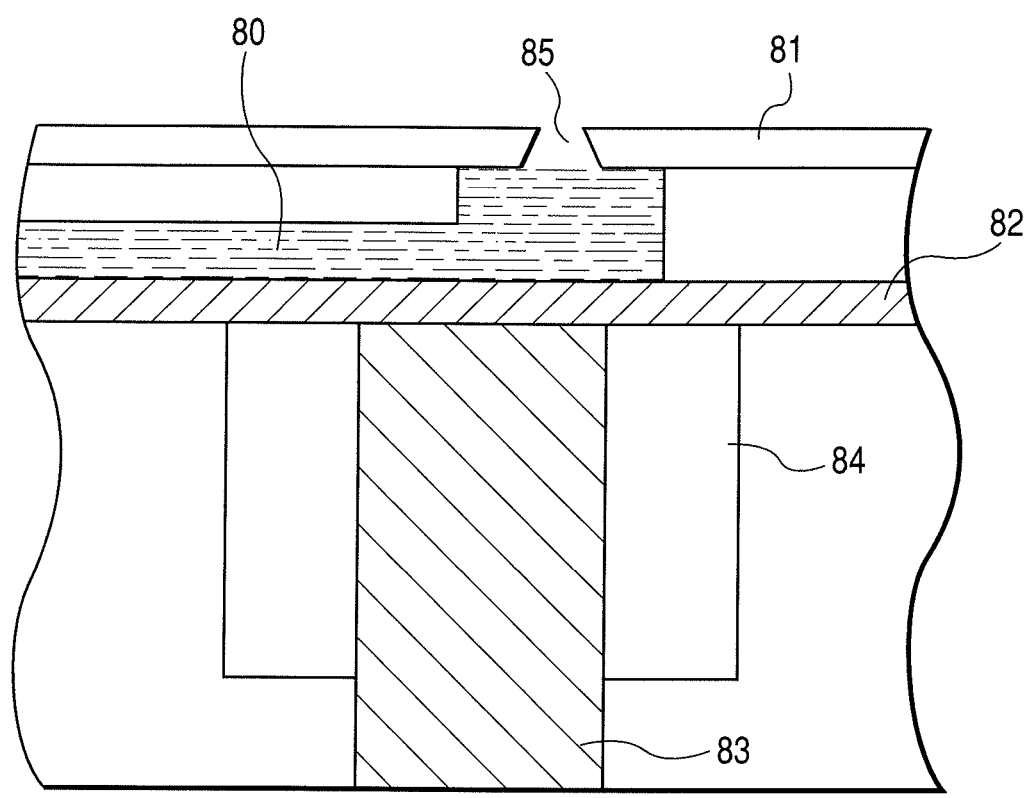
FIG. 8 is a diagrammatic view showing an example of the configuration of a recording head.

FIG. 8 is a diagrammatic view showing an example of the configuration of such a recording head. The recording head is made up of an ink channel 80 communicating with an ink chamber (not shown), an orifice plate 81, a vibrating plate 82 which causes a pressure to act directly on the ink, a piezoelectric device 83 which is joined to this vibrating plate 82 and is distorted according to electric signals, and a substrate 84 for supporting and fixing the orifice plate 81 and the vibrating plate 82. Distortion stress produced by imparting a pulsewise voltage to the piezoelectric device 83 deforms the vibrating plate jointed to the piezoelectric device 83, to thereby apply pressure to the ink inside the ink channel 80, so that ink droplets are ejected from an ejection orifice 85 of the orifice plate 81. Such a recording head may be used in the state it is incorporated in the same ink jet recording apparatus as that shown in FIG. 5.

EXAMPLES

The present invention is described below in greater detail by giving Examples, Comparative Examples and Reference Examples. The present invention is by no means limited by the following Examples unless it is beyond its gist. In the following, reference to "part(s)" or "%" is by mass unless particularly noted.

Preparation of Pigment Dispersions 10 parts of a pigment, 5 parts of each polymer of Polymers 1 to 28 obtained from copolymerizing the monomers shown in Table 1 (the weight average molecular weight of each polymer is shown in Table 1) and 85 parts of ion-exchange water were mixed, followed by dispersion for 3 hours by means of a batch type vertical sand mill to prepare each pigment dispersion. C.I. Pigment Blue 15:3 was used as the pigment. Each polymer was neutralized with an aqueous 10% by mass potassium hydroxide solution and was used as the polymer. The dispersions thus obtained were each subjected to pressure filtration with a filter of 2.5 μm in pore size (trade name: HD CII, available from Nihon Pall Ltd.). To these dispersions, water was added to prepare Pigment Dispersions 1 to 28 each having a pigment concentration of 10% by mass and a polymer concentration of 5% by mass. In the table 1, the monomers are abbreviated as follows.

St: styrene

α-MSt: α-methylstyrene

BZMA: benzyl methacrylate nBA: n-butyl acrylate

MMA: methyl methacrylate

MA: methacrylate

AA: acrylic acid

TABLE 1

Primary Properties of Pigment Dispersions 1 to 28

| | | Polymer No. in pigment dispersion | Weight average molecular weight of polymer | Compositional (mass) ratio of monomers constituting each polymer | | | | | | |
|---|---|---|---|---|---|---|---|---|---|---|
| | | | | St | α-MSt | BZMA | nBA | MMA | MA | AA |
| Pigment Dispersion: | 1 | Polymer 1 | 5,000 | 28 | | | | 58 | | 14 |
| | 2 | Polymer 2 | 15,000 | 12 | | 72 | | | 16 | |
| | 3 | Polymer 3 | 5,000 | | | 83 | | | | 17 |
| | 4 | Polymer 4 | 5,000 | 18 | | | 68 | | | 14 |
| | 5 | Polymer 5 | 5,000 | 33 | | | 44 | | | 23 |
| | 6 | Polymer 6 | 5,000 | 80 | | | 6 | | | 14 |
| | 7 | Polymer 7 | 6,000 | 18 | | | 68 | | | 14 |
| | 8 | Polymer 8 | 9,000 | 18 | | | 68 | | | 14 |

TABLE 1-continued

Primary Properties of Pigment Dispersions 1 to 28

| Polymer No. in pigment dispersion | Weight average molecular weight of polymer | Compositional (mass) ratio of monomers constituting each polymer | | | | | | |
|---|---|---|---|---|---|---|---|---|
| | | St | α-MSt | BZMA | nBA | MMA | MA | AA |
| 9 Polymer 9 | 10,000 | 18 | | | 68 | | | 14 |
| 10 Polymer 10 | 5,000 | 72 | | | 15 | | | 13 |
| 11 Polymer 11 | 5,000 | 57 | | | 29 | | | 14 |
| 12 Polymer 12 | 5,000 | 65 | | | 22 | | | 13 |
| 13 Polymer 13 | 5,000 | 7 | | | 69 | | | 24 |
| 14 Polymer 14 | 5,000 | 84 | | | 2 | | | 14 |
| 15 Polymer 15 | 5,000 | 14 | | | 75 | | | 11 |
| 16 Polymer 16 | 5,000 | 39 | | | 36 | | | 25 |
| 17 Polymer 17 | 6,000 | 71 | | 8 | | | | 21 |
| 18 Polymer 18 | 6,000 | 48 | 34 | | | | | 18 |
| 19 Polymer 19 | 6,000 | 40 | 35 | | | | | 25 |
| 20 Polymer 20 | 9,000 | 40 | 35 | | | | | 25 |
| 21 Polymer 21 | 9,000 | 48 | 34 | | | | | 18 |
| 22 Polymer 22 | 6,000 | 82 | | | | | | 18 |
| 23 Polymer 23 | 6,000 | 39 | 36 | | | | | 25 |
| 24 Polymer 24 | 5,000 | 48 | 34 | | | | | 18 |
| 25 Polymer 25 | 10,000 | 48 | 34 | | | | | 18 |
| 26 Polymer 26 | 6,000 | 65 | | 17 | | | | 18 |
| 27 Polymer 27 | 6,000 | 49 | 35 | | | | | 16 |
| 28 Polymer 28 | 6,000 | 70 | | 5 | | | | 25 |

Hydrogen bond parameter (δh) of polymer that is obtained by the solubility parameters of monomers constituting the polymer:

The hydrogen bond parameter (δh) of polymer that is obtained by the solubility parameters of monomers constituting the polymer was found in the following way. First, the hydrogen bond parameter (δh) of each monomer constituting the subject polymer was obtained by the solubility parameter inherent in each monomer constituting the polymer. Then, the hydrogen bond parameter (δh) of each monomer constituting the polymer obtained above was multiplied by the compositional (mass) ratio of each monomer constituting the polymer (compositional ratio when the sum total is defined as 1) to find respective values. Next, the resulting values were summed up to find the hydrogen bond parameter (δh) of polymer that is obtained by the solubility parameters of monomers constituting the polymer. In respect of each polymer used in preparing the pigment dispersions, the hydrogen bond parameter (δh) of each monomer that was obtained by the solubility parameter inherent in each monomer constituting the polymer is shown in Table 2.

Taking Polymer 1 as an example, which is a copolymer of styrene, methyl methacrylate and acrylic acid (compositional (mass) ratio =28:58:14), it will be specifically explained below how to find the hydrogen bond parameter (δh) of polymer that is obtained by the solubility parameters of monomers constituting the polymer. As is seen from Table 2 below, the hydrogen bond parameters (the unit is $cal^{0.5}/cm^{1.5}$) obtained by the solubility parameters of styrene, methyl methacrylate and acrylic acid constituting the Polymer 1are 0.00, 3.93 and 5.81, respectively. Therefore, the hydrogen bond parameter (δh) of Polymer 1 that is obtained by the solubility parameters of monomers constituting Polymer 1 is found as shown by the following expression.

"Hydrogen bond parameter (δh) of polymer that is obtained by the solubility parameters of monomers constituting the polymer"

$$= 0.00 \times 0.28 + 3.93 \times 0.58 + 5.81 \times 0.14$$

$$= 3.09 \ cal^{0.5}/cm^{1.5}.$$

TABLE 2

Hydrogen Bond Parameter of Each Monomer

| Monomer | | Hydrogen bond parameter (δh) |
|---|---|---|
| Type | Abbr. | $(cal^{0.5}/cm^{1.5})*1$ |
| Styrene | St | 0.00 |
| α-Methylstyrene | α-MSt | 0.00 |
| Benzyl methacrylate | BZMA | 3.21 |
| n-Butyl acrylate | nBA | 3.44 |
| Methyl methacrylate | MMA | 3.93 |
| Methacrylate | MA | 5.30 |
| Acrylic acid | AA | 5.81 |

*1Hydrogen bond parameter (δh) obtained by the solubility parameter inherent in each monomer.

In respect of the polymers in the pigment dispersions prepared beforehand, the values of the hydrogen bond parameter (δh) of polymer that is obtained by the solubility parameters of monomers constituting the polymer are shown in Table 3. The values of the acid value and weight average molecular weight of each polymer are also shown in Table 3. Further, Table 3 shows the values of the mass ratio of n-butyl acrylate or α-methylstyrene to styrene in the polymers each having, as monomers, styrene and n-butyl acrylate, or styrene and α-methylstyrene.

TABLE 3

Properties of Polymer in Each Pigment Dispersion

|  |  | Polymer | Hydrogen bond parameter (δh) of polymer $(cal^{0.5}/cm^{1.5})$ *1 | Acid value of polymer (mgKOH/g) | Weight average molecular weight of Polymer | nBA/St *2 | α-MSt/St *3 |
|---|---|---|---|---|---|---|---|
| Pigment Dispersion: | 1 | Polymer 1 | 3.09 | 90 | 5,000 | — | — |
|  | 2 | Polymer 2 | 3.16 | 90 | 15,000 | — | — |
|  | 3 | Polymer 3 | 3.65 | 90 | 5,000 | — | — |
|  | 4 | Polymer 4 | 3.15 | 90 | 5,000 | 3.78 | — |
|  | 5 | Polymer 5 | 2.85 | 150 | 5,000 | 1.33 | — |
|  | 6 | Polymer 6 | 1.02 | 90 | 5,000 | 0.08 | — |
|  | 7 | Polymer 7 | 3.15 | 90 | 6,000 | 3.78 | — |
|  | 8 | Polymer 8 | 3.15 | 90 | 9,000 | 3.78 | — |
|  | 9 | Polymer 9 | 3.15 | 90 | 10,000 | 3.78 | — |
|  | 10 | Polymer 10 | 1.27 | 90 | 5,000 | 0.21 | — |
|  | 11 | Polymer 11 | 1.81 | 90 | 5,000 | 0.51 | — |
|  | 12 | Polymer 12 | 1.51 | 90 | 5,000 | 0.34 | — |
|  | 13 | Polymer 13 | 3.77 | 150 | 5,000 | 9.86 | — |
|  | 14 | Polymer 14 | 0.88 | 90 | 5,000 | 0.02 | — |
|  | 15 | Polymer 15 | 3.22 | 80 | 5,000 | 5.36 | — |
|  | 16 | Polymer 16 | 2.69 | 160 | 5,000 | 0.92 | — |
|  | 17 | Polymer 17 | 1.48 | 160 | 6,000 | — | — |
|  | 18 | Polymer 18 | 1.05 | 160 | 6,000 | — | 0.71 |
|  | 19 | Polymer 19 | 1.45 | 200 | 6,000 | — | 0.88 |
|  | 20 | Polymer 20 | 1.45 | 200 | 9,000 | — | 0.88 |
|  | 21 | Polymer 21 | 1.05 | 160 | 9,000 | — | 0.71 |
|  | 22 | Polymer 22 | 1.05 | 160 | 6,000 | — | — |
|  | 23 | Polymer 23 | 1.45 | 200 | 6,000 | — | 0.92 |
|  | 24 | Polymer 24 | 1.05 | 160 | 5,000 | — | 0.71 |
|  | 25 | Polymer 25 | 1.05 | 160 | 10,000 | — | 0.71 |
|  | 26 | Polymer 26 | 1.59 | 160 | 6,000 | — | — |
|  | 27 | Polymer 27 | 0.93 | 160 | 6,000 | — | 0.71 |
|  | 28 | Polymer 28 | 1.61 | 210 | 6,000 | — | — |

*1: Hydrogen bond parameter (δh) of polymer that is obtained by the solubility parameters of monomers constituting the polymer.
*2: Mass ratio of n-butyl acrylate to styrene in polymer.
*3: Mass ratio of α-methylstyrene to styrene in polymer.

Synthesis of Modified Siloxane Compound

Modified siloxane compounds, Compounds 1 to 12, were synthesized according to the following Synthesis Examples.

Compound 1:

Using a container made of glass and provided with a thermometer and a stirring means, Compound 1 was synthesized in the following way. In the container, a polysiloxane compound represented by the following Formula (A) and a polyoxyethylene compound represented by the following Formula (B) as main components were subjected to addition reaction in the presence of a platinum catalyst to synthesize Compound 1. Compound 1 thus obtained corresponded to the modified siloxane compound represented by Formula (1), and was found to have a weight average molecular weight of 8,500, an HLB of 5 (theoretical value) and a solubility in water of 1% or less. The Compound 1 had the structure of $m=73$, $n=6$, $R_1$=propylene group, $a=8$, $b=0$ and $R_2$=hydrogen atom in the Formula (1).

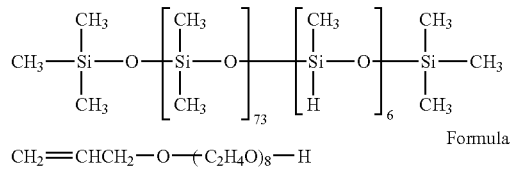

Formula (A)

$CH_2\!=\!CHCH_2\!-\!O\!-\!(C_2H_4O)_8\!-\!H$

Formula (B)

Compound 2:

Using a container made of glass and provided with a thermometer and a stirring means, Compound 2 was synthesized in the following way. In the container, a polysiloxane compound represented by the following Formula (C) and a polyoxyethylene compound represented by the following Formula (D) as main components were subjected to addition reaction in the presence of a platinum catalyst to synthesize Compound 2. Compound 2 thus obtained corresponded to the modified siloxane compound represented by Formula (1), and was found to have a weight average molecular weight of 29,400, an HLB of 5 (theoretical value) and a solubility in water of 1% or less. The Compound 2 had the structure of $m=245$, $n=28$, $R_1$=propylene group, $a=6$, $b=0$ and $R_2$=hydrogen atom in the Formula (1).

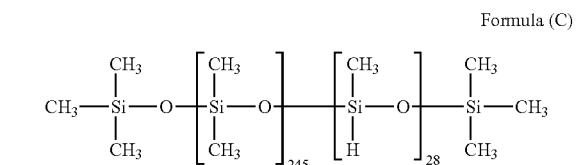

Formula (C)

$CH_2\!=\!CHCH_2\!-\!O\!-\!(C_2H_4O)_6\!-\!H$

Formula (D)

Compound 3:

Using a container made of glass and provided with a thermometer and a stirring means, Compound 3 was synthesized in the following way. In the container, a polysiloxane compound represented by the following Formula (E) and a polyoxyethylene compound represented by the following Formula (B) as main components were subjected to addition reaction in the presence of a platinum catalyst to synthesize Compound 3. Compound 3 thus obtained was a comparative compound of the modified siloxane compound represented by Formula (1), and was found to have a weight average molecular weight of 7,400, an HLB of 5 (theoretical value) and a solubility in water of 1% or less. The Compound 3 had the structure of m=65, n=5, $R_1$=propylene group, a=8, b=0 and $R_2$=hydrogen atom in the Formula (1).

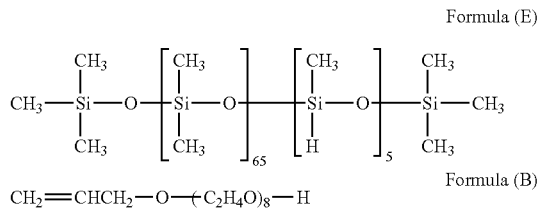

Compound 4:

Using a container made of glass and provided with a thermometer and a stirring means, Compound 4 was synthesized in the following way. In the container, a polysiloxane compound represented by the following Formula (F) and a polyoxyethylene compound represented by the following Formula (G) as main components were subjected to addition reaction in the presence of a platinum catalyst to synthesize Compound 4. Compound 4 thus obtained corresponded to the modified siloxane compound represented by Formula (2), and was found to have a weight average molecular weight of 47,000, an HLB of 9 (theoretical value) and a solubility in water of 1% or less. The Compound 4 had the structure of p=349, $R_3$=hydrogen atom, $R_4$=propylene group, c=240 and d=0 in the Formula (2).

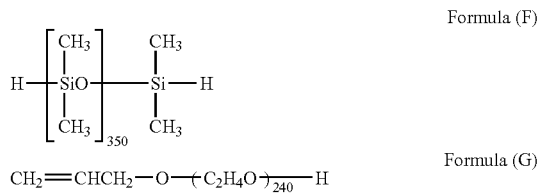

Compound 5:

Using a container made of glass and provided with a thermometer and a stirring means, Compound 5 was synthesized in the following way. In the container, a polysiloxane compound represented by the following Formula (H) and a polyoxyethylene compound represented by the following Formula (I) as main components were subjected to addition reaction in the presence of a platinum catalyst to synthesize Compound 5. Compound 5 thus obtained was a comparative compound of the modified siloxane compound represented by Formula (2), and was found to have a weight average molecular weight of 7,700, an HLB of 7 (theoretical value) and a solubility in water of 1% or less. The Compound 5 had the structure of p=64, $R_3$=hydrogen atom, $R_4$=propylene group, c=30 and d=0 in the Formula (2).

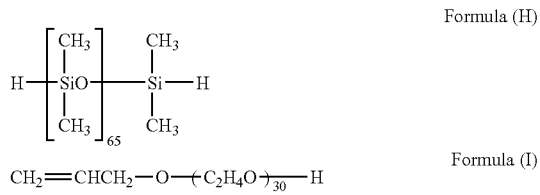

Compound 6:

Using a container made of glass and provided with a thermometer and a stirring means, Compound 6 was synthesized in the following way. In the container, a polysiloxane compound represented by the following Formula (J) and a polyoxyethylene compound represented by the following Formula (K) as main components were subjected to addition reaction in the presence of a platinum catalyst to synthesize Compound 6. Compound 6 thus obtained was a comparative compound of the modified siloxane compound represented by Formula (2), and was found to have a weight average molecular weight of 50,400, an HLB of 7 (theoretical value) and a solubility in water of 1% or less. The Compound 6 had the structure of p=439, $R_3$=hydrogen atom, $R_4$=propylene group, c=200 and d=0 in the Formula (2).

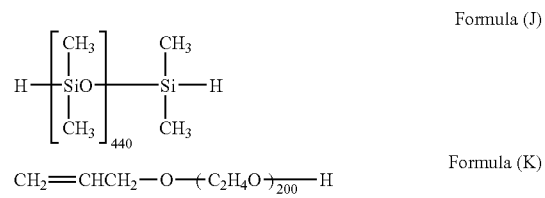

Compound 7:

Using a container made of glass and provided with a thermometer and a stirring means, Compound 7 was synthesized in the following way. In the container, a polysiloxane compound represented by the following Formula (L) and a polyoxyethylene compound represented by the following Formula (M) as main components were subjected to addition reaction in the presence of a platinum catalyst to synthesize Compound 7. Compound 7 thus obtained corresponded to the modified siloxane compound represented by Formula (3), and was found to have a weight average molecular weight of 49,000, an HLB of 6 (theoretical value) and a solubility in water of 1% or less. The Compound 7 had the structure of q=7, $R_5$=propylene group, $R_6$=propylene group, e=6, f=0 and r=52 in the Formula (3).

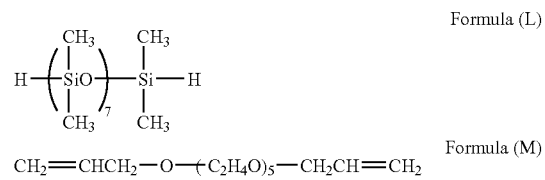

Compound 8:

Using a container made of glass and provided with a thermometer and a stirring means, Compound 8 was synthesized in the following way. In the container, a polysiloxane compound represented by the following Formula (N) and a polyoxyethylene compound represented by the following Formula (O) as main components were subjected to addition reaction in the presence of a platinum catalyst to synthesize Compound 8. Compound 8 thus obtained corresponded to the modified siloxane compound represented by Formula (3), and was found to have a weight average molecular weight of 8,800, an HLB of 6 (theoretical value) and a solubility in water of 1% or less. The Compound 8 had the structure of $q=23$, $R_5$=propylene group, $R_6$=propylene group, $e=18$, $f=0$ and $r=3$ in the Formula (3).

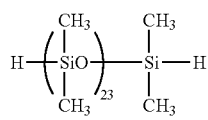

Formula (N)

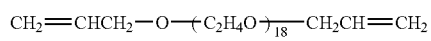

Formula (O)

Compound 9:

Using a container made of glass and provided with a thermometer and a stirring means, Compound 9 was synthesized in the following way. In the container, a polysiloxane compound represented by the following Formula (P) and a polyoxyethylene compound represented by the following Formula (O) as main components were subjected to addition reaction in the presence of a platinum catalyst to synthesize Compound 9. Compound 9 thus obtained was a comparative compound of the modified siloxane compound represented by Formula (3), and was found to have a weight average molecular weight of 49,000, an HLB of 7 (theoretical value) and a solubility in water of 1% or less. The Compound 9 had the structure of $q=18$, $R_5$=propylene group, $R_6$=propylene group, $e=18$, $f=0$ and $r=21$ in the Formula (3).

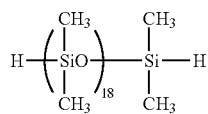

Formula (P)

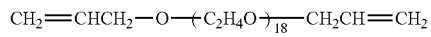

Formula (O)

Compound 10:

Using a container made of glass and provided with a thermometer and a stirring means, Compound 10 was synthesized in the following way. In the container, a polysiloxane compound represented by the following Formula (Q) and a polyoxyethylene compound represented by the following Formula (O) as main components were subjected to addition reaction in the presence of a platinum catalyst to synthesize Compound 10. Compound 10 thus obtained was a comparative compound of the modified siloxane compound represented by Formula (3), and was found to have a weight average molecular weight of 55,000, an HLB of 6 (theoretical value) and a solubility in water of 1% or less. The Compound 10 had the structure of $q=24$, $R_5$=propylene group, $R_6$=propylene group, $e=18$, $f=0$ and $r=20$ in the Formula (3).

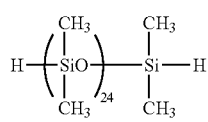

Formula (Q)

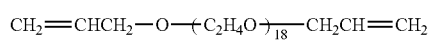

Formula (O)

Compound 11:

Using a container made of glass and provided with a thermometer and a stirring means, Compound 11 was synthesized in the following way. In the container, a polysiloxane compound represented by the following Formula (R) and a polyoxyethylene compound represented by the following Formula (S) as main components were subjected to addition reaction in the presence of a platinum catalyst to synthesize Compound 11. Compound 11 thus obtained corresponded to the modified siloxane compound represented by Formula (3), and was found to have a weight average molecular weight of 8,800, an HLB of 1 (theoretical value) and a solubility in water of 1% or less. The Compound 11 had the structure of $q=16$, $R_5$=propylene group, $R_6$=propylene group, $e=2$, $f=0$ and $r=6$ in the Formula (3).

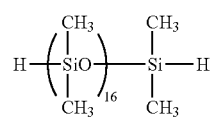

Formula (R)

Formula (S)

Compound 12:

Using a container made of glass and provided with a thermometer and a stirring means, Compound 12 was synthesized in the following way. In the container, a polysiloxane compound represented by the following Formula (T) and a polyoxyethylene compound represented by the following Formula (U) as main components were subjected to addition reaction in the presence of a platinum catalyst to synthesize Compound 12. Compound 12 thus obtained was a comparative compound of the modified siloxane compound represented by Formula (3), and was found to have a weight average molecular weight of 7,800, an HLB of 6 (theoretical value) and a solubility in water of 1% or less. The Compound 12 had the structure of $q=8$, $R_5$=propylene group, $R_6$=propylene group, $e=7$, $f=0$ and $r=7$ in the Formula (3).

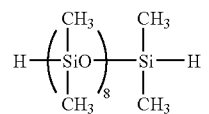

Formula (T)

Formula (U)

The weight average molecular weight of each compound obtained as above was measured in the following way. The modified siloxane compound to be measured was put in tetrahydrofuran (THF) and left standing for several hours to dissolve, preparing a solution so as for the sample to be in a concentration of 0.1% by mass. Thereafter, the solution was filtered with a solvent-resistant membrane filter of 0.45 μm in pore size (trade name: TITAN 2 Syringe Filter, PTFE, 0.45 μm; available from SUN-SRi). Using this sample solution, the weight average molecular weight was measured under the following conditions.

Apparatus: Alliance GPC 2695 (manufactured by Waters Corporation).

Columns: SHODEX KF-806M, four columns connected (available from Showa Denko K.K.).

Mobile phase: tetrahydrofuran (special grade).

Flow rate: 1.0 mL/min.

Oven temperature: 40.0° C.

Amount of sample solution injected: 0.1 mL.

Detector: RI (refractive index) detector.

Polystyrene standard samples: PS-1 and PS-2 (available from Polymer Laboratories Inc.); molecular weight: 7,500,000, 2,560,000, 841,700, 377,400, 320,000, 210,500, 148,000, 96,000, 59,500, 50,400, 28,500, 20,650, 10,850, 5,460, 2,930, 1,300 and 580, seventeen types.

Preparation of Inks

Inks were prepared by using components shown in the upper portion of the following Tables 4-1 to 4-11, including the pigment dispersions prepared as above, the modified siloxane compounds synthesized as above or commercially available modified siloxane compounds. Specifically, the components shown in the upper portion of Tables 4-1 to 4-11 were mixed according to the formulation as shown in each Table, and were thoroughly stirred, followed by pressure filtration with a filter of 2.5 μm in pore size (trade name: HD CII, available from Nihon Pall Ltd.) to prepare inks. Values of the pigment content and polymer content in each ink and the mass ratio of polymer content to pigment content (polymer/pigment) are shown in the lower columns of Tables 4-1 to 4-11. In Tables 4-1 to 4-11, "Mw" refers to weight average molecular weight.

TABLE 4-1

| Ink Formulation (Unit in upper portion: %) | | | | | | | | | | | | | | | |
|---|---|---|---|---|---|---|---|---|---|---|---|---|---|---|---|
| | Ink | | | | | | | | | | | | | | |
| | 1 | 2 | 3 | 4 | 5 | 6 | 7 | 8 | 9 | 10 | 11 | 12 | 13 | 14 | 15 |
| Glycerol | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Polyethylene glycol (av. molecular weight: 1,000) | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Pigment Dispersion 11 | 28.0 | 28.0 | 28.0 | 28.0 | 28.0 | 28.0 | 28.0 | 28.0 | 28.0 | 28.0 | 28.0 | 28.0 | 28.0 | 30.0 | 30.0 |
| Polymer 11 | 2.6 | 2.6 | 2.6 | 2.6 | 2.6 | 2.6 | 2.6 | 2.6 | 2.6 | 2.6 | 1.1 | 1.0 | 2.8 | 1.8 | 2.1 |
| FZ-2104 (Dow Corning Toray) (Mw: 20,600; HLB: 9) | 0.5 | | | | | | | | | | | 0.5 | 0.5 | 0.5 | 0.5 | 0.5 |
| FZ-2130 (Dow Corning Toray) (Mw: 21,500; HLB: 7) | | 0.5 | | | | | | | | 0.4 | | | | | |
| FZ-2191 (Dow Corning Toray) (Mw: 18,000; HLB: 5) | | | 0.5 | | | | | | | | | | | | |
| KF-615A (Shin-Etsu Chemical) (Mw: 18,000; HLB: 10) | | | | 0.5 | | | | 2.9 | 3.0 | | | | | | |
| TSF4452 (GE Toshiba Silicone) (Mw: 26,000; HLB: 11) | | | | | 0.5 | | | | | | | | | | |
| Compound 1 (Mw: 8,500; HLB: 5) | | | | | | 0.5 | | | | | | | | | |
| Compound 2 (Mw: 29,400; HLB: 5) | | | | | | | 0.5 | | | | | | | | |
| Water | 53.9 | 53.9 | 53.9 | 53.9 | 53.9 | 53.9 | 53.9 | 51.5 | 51.4 | 54.0 | 55.4 | 55.5 | 53.7 | 52.7 | 52.4 |
| Pigment content (% by mass) | 2.8 | 2.8 | 2.8 | 2.8 | 2.8 | 2.8 | 2.8 | 2.8 | 2.8 | 2.8 | 2.8 | 2.8 | 2.8 | 3.0 | 3.0 |
| Polymer content (% by mass) | 4.0 | 4.0 | 4.0 | 4.0 | 4.0 | 4.0 | 4.0 | 4.0 | 4.0 | 4.0 | 2.5 | 2.4 | 4.2 | 3.3 | 3.6 |
| Polymer/pigment (time(s)) | 1.4 | 1.4 | 1.4 | 1.4 | 1.4 | 1.4 | 1.4 | 1.4 | 1.4 | 1.4 | 0.89 | 0.86 | 1.5 | 1.1 | 1.2 |

TABLE 4-2

Ink Formulation (Unit in upper portion: %)

| | Ink | | | | | | | | | | |
|---|---|---|---|---|---|---|---|---|---|---|---|
| | 16 | 17 | 18 | 19 | 20 | 21 | 22 | 23 | 24 | 25 | 26 |
| Glycerol | 5.0 | 5.0 | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 | 5.0 | 5.0 |
| Polyethylene glycol (av. molecular weight: 1,000 | 5.0 | 5.0 | 5.0 | 5.0 | 5.0 | 5.0 | 5.0 | 5.0 | 5.0 | 5.0 | 5.0 |
| Pigment Dispersion 1 | 28.0 | | | | | | | | | | |
| Pigment Dispersion 2 | | 28.0 | | | | | | | | | |
| Pigment Dispersion 3 | | | 28.0 | | | | | | | | |
| Pigment Dispersion 4 | | | | 28.0 | | | | | | | |
| Pigment Dispersion 5 | | | | | 28.0 | | | | | | |
| Pigment Dispersion 6 | | | | | | 28.0 | | | | | |
| Pigment Dispersion 7 | | | | | | | 28.0 | | | | |
| Pigment Dispersion 8 | | | | | | | | 28.0 | | | |
| Pigment Dispersion 9 | | | | | | | | | 28.0 | | |
| Pigment Dispersion 10 | | | | | | | | | | 28.0 | |
| Pigment Dispersion 12 | | | | | | | | | | | 28.0 |
| Polymer 1 | 2.6 | | | | | | | | | | |
| Polymer 2 | | 2.6 | | | | | | | | | |
| Polymer 3 | | | 2.6 | | | | | | | | |
| Polymer 4 | | | | 2.6 | | | | | | | |
| Polymer 5 | | | | | 2.6 | | | | | | |
| Polymer 6 | | | | | | 2.6 | | | | | |
| Polymer 7 | | | | | | | 2.6 | | | | |
| Polymer 8 | | | | | | | | 2.6 | | | |
| Polymer 9 | | | | | | | | | 2.6 | | |
| Polymer 10 | | | | | | | | | | 2.6 | |
| Polymer 12 | | | | | | | | | | | 2.6 |
| FZ-2104 (Dow Corning Toray) (Mw: 20,600; HLB: 9) | 0.5 | 0.5 | 0.5 | 0.5 | 0.5 | 0.5 | 0.5 | 0.5 | 0.5 | 0.5 | 0.5 |
| Water | 53.9 | 53.9 | 53.9 | 53.9 | 53.9 | 53.9 | 53.9 | 53.9 | 53.9 | 53.9 | 53.9 |
| Pigment content (% by mass) | 2.8 | 2.8 | 2.8 | 2.8 | 2.8 | 2.8 | 2.8 | 2.8 | 2.8 | 2.8 | 2.8 |
| Polymer content (% by mass) | 4.0 | 4.0 | 4.0 | 4.0 | 4.0 | 4.0 | 4.0 | 4.0 | 4.0 | 4.0 | 4.0 |
| Polymer/pigment (times) | 1.4 | 1.4 | 1.4 | 1.4 | 1.4 | 1.4 | 1.4 | 1.4 | 1.4 | 1.4 | 1.4 |

TABLE 4-3

Ink Formulation (Unit in upper portion: %)

| | Ink | | | | | | | |
|---|---|---|---|---|---|---|---|---|
| | 27 | 28 | 29 | 30 | 31 | 32 | 33 | 34 |
| Glycerol | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 |
| Polyethylene glycol (av. molecular weight: 1,000) | 5.0 | 5.0 | 5.0 | 5.0 | 5.0 | 5.0 | 5.0 | 5.0 |
| Pigment Dispersion 11 | 28.0 | 28.0 | 28.0 | 28.0 | | | | |
| Pigment Dispersion 13 | | | | | 28.0 | | | |
| Pigment Dispersion 14 | | | | | | 28.0 | | |
| Pigment Dispersion 15 | | | | | | | 28.0 | |
| Pigment Dispersion 16 | | | | | 28.0 | | | |
| Polymer 11 | 2.6 | 2.6 | 2.6 | 2.6 | | | | |
| Polymer 13 | | | | | 2.6 | | | |
| Polymer 14 | | | | | | 2.6 | | |
| Polymer 15 | | | | | | | 2.6 | |
| Polymer 16 | | | | | | | | 2.6 |
| FZ-2104 (Dow Corning Toray) (Mw: 20,600; HLB: 9) | | | | 0.5 | 0.5 | 0.5 | 0.5 | 0.5 |
| FZ-2110 (Dow Corning Toray) (Mw: 7,200; HLB: 1) | 0.5 | | | | | | | |
| FZ-2162 (Dow Corning Toray) (Mw: 4,300; HLB: 15) | | 0.5 | | | | | | |
| KF-354L (Shin-Etsu Chemical) (Mw: 7,900; HLB: 15) | | | 0.5 | | | | | |
| Compound 3 (Mw: 7,400; HLB: 5) | | | | 0.5 | | | | |
| Water | 53.9 | 53.9 | 53.9 | 53.9 | 53.9 | 53.9 | 53.9 | 53.9 |
| Pigment content (% by mass) | 2.8 | 2.8 | 2.8 | 2.8 | 2.8 | 2.8 | 2.8 | 2.8 |
| Polymer content (% by mass) | 4 | 4 | 4 | 4 | 4 | 4 | 4 | 4 |
| Polymer/pigment (times) | 1.4 | 1.4 | 1.4 | 1.4 | 1.4 | 1.4 | 1.4 | 1.4 |

TABLE 4-4

Ink Formulation (Unit in upper portion: %)

| | Ink | | | | | | | | | | |
|---|---|---|---|---|---|---|---|---|---|---|---|
| | 35 | 36 | 37 | 38 | 39 | 40 | 41 | 42 | 43 | 44 | 45 |
| Glycerol | 5.0 | 5.0 | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 | 5.0 | 5.0 |
| Polyethylene glycol (av. molecular weight: 1,000) | 5.0 | 5.0 | 5.0 | 5.0 | 5.0 | 5.0 | 5.0 | 5.0 | 5.0 | 5.0 | 5.0 |
| Pigment Dispersion 11 | 28.0 | 28.0 | 28.0 | 28.0 | 28.0 | 28.0 | 28.0 | 28.0 | 28.0 | 30.0 | 30.0 |
| Polymer 11 | 2.6 | 2.6 | 2.6 | 2.6 | 2.6 | 2.6 | 1.1 | 1.0 | 2.8 | 1.8 | 2.1 |
| BYK333 (Byk Chemie) (Mw: 8,000; HLB: 10) | 0.5 | | 2.9 | 3.0 | 0.4 | 1.0 | 2.9 | 2.9 | 1.0 | 1.0 | 1.0 |
| Compound 4 (Mw: 47,000; HLB: 9) | | 0.5 | | | | | | | | | |
| Water | 53.9 | 53.9 | 51.5 | 51.4 | 54.0 | 53.4 | 53.0 | 53.1 | 53.2 | 52.2 | 51.9 |
| Pigment content (% by mass) | 2.8 | 2.8 | 2.8 | 2.8 | 2.8 | 2.8 | 2.8 | 2.8 | 2.8 | 3.0 | 3.0 |
| Polymer content (% by mass) | 4.0 | 4.0 | 4.0 | 4.0 | 4.0 | 4.0 | 2.5 | 2.4 | 4.2 | 3.3 | 3.6 |
| Polymer/pigment (time(s)) | 1.4 | 1.4 | 1.4 | 1.4 | 1.4 | 1.4 | 0.89 | 0.86 | 1.5 | 1.1 | 1.2 |

TABLE 4-5

Ink Formulation (Unit in upper column: %)

| | Ink | | | | | | | | | | |
|---|---|---|---|---|---|---|---|---|---|---|---|
| | 46 | 47 | 48 | 49 | 50 | 51 | 52 | 53 | 54 | 55 | 56 |
| Glycerol | 5.0 | 5.0 | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 | 5.0 | 5.0 |
| Polyethylene glycol (av. molecular weight: 1,000) | 5.0 | 5.0 | 5.0 | 5.0 | 5.0 | 5.0 | 5.0 | 5.0 | 5.0 | 5.0 | 5.0 |
| Pigment Dispersion 1 | 28.0 | | | | | | | | | | |
| Pigment Dispersion 2 | | 28.0 | | | | | | | | | |
| Pigment Dispersion 3 | | | 28.0 | | | | | | | | |
| Pigment Dispersion 4 | | | | 28.0 | | | | | | | |
| Pigment Dispersion 5 | | | | | 28.0 | | | | | | |
| Pigment Dispersion 6 | | | | | | 28.0 | | | | | |
| Pigment Dispersion 7 | | | | | | | 28.0 | | | | |
| Pigment Dispersion 8 | | | | | | | | 28.0 | | | |
| Pigment Dispersion 9 | | | | | | | | | 28.0 | | |
| Pigment Dispersion 10 | | | | | | | | | | 28.0 | |
| Pigment Dispersion 12 | | | | | | | | | | | 28.0 |
| Polymer 1 | 2.6 | | | | | | | | | | |
| Polymer 2 | | 2.6 | | | | | | | | | |
| Polymer 3 | | | 2.6 | | | | | | | | |
| Polymer 4 | | | | 2.6 | | | | | | | |
| Polymer 5 | | | | | 2.6 | | | | | | |
| Polymer 6 | | | | | | 2.6 | | | | | |
| Polymer 7 | | | | | | | 2.6 | | | | |
| Polymer 8 | | | | | | | | 2.6 | | | |
| Polymer 9 | | | | | | | | | 2.6 | | |
| Polymer 10 | | | | | | | | | | 2.6 | |
| Polymer 12 | | | | | | | | | | | 2.6 |
| BYK333 (Byk Chemie) (Mw: 8,000; HLB: 10) | 1.0 | 1.0 | 1.0 | 1.0 | 1.0 | 1.0 | 1.0 | 1.0 | 1.0 | 1.0 | 1.0 |
| Water | 53.4 | 53.4 | 53.4 | 53.4 | 53.4 | 53.4 | 53.4 | 53.4 | 53.4 | 53.4 | 53.4 |
| Pigment content (% by mass) | 2.8 | 2.8 | 2.8 | 2.8 | 2.8 | 2.8 | 2.8 | 2.8 | 2.8 | 2.8 | 2.8 |
| Polymer content (% by mass) | 4.0 | 4.0 | 4.0 | 4.0 | 4.0 | 4.0 | 4.0 | 4.0 | 4.0 | 4.0 | 4.0 |
| Polymer/pigment (times) | 1.4 | 1.4 | 1.4 | 1.4 | 1.4 | 1.4 | 1.4 | 1.4 | 1.4 | 1.4 | 1.4 |

TABLE 4-6

Ink Formulation (Unit in upper portion: %)

| | Ink | | | | | | |
|---|---|---|---|---|---|---|---|
| | 57 | 58 | 59 | 60 | 61 | 62 | 63 |
| Glycerol | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 |
| Polyethylene glycol (av. molecular weight: 1,000) | 5.0 | 5.0 | 5.0 | 5.0 | 5.0 | 5.0 | 5.0 |

TABLE 4-6-continued

Ink Formulation (Unit in upper portion: %)

| | Ink | | | | | | |
|---|---|---|---|---|---|---|---|
| | 57 | 58 | 59 | 60 | 61 | 62 | 63 |
| Pigment Dispersion 11 | 28.0 | 28.0 | 28.0 | | | | |
| Pigment Dispersion 13 | | | | 28.0 | | | |
| Pigment Dispersion 14 | | | | | | 28.0 | |
| Pigment Dispersion 15 | | | | | | | 28.0 |
| Pigment Dispersion 16 | | | | | 28.0 | | |
| Polymer 11 | 2.6 | 2.6 | 2.6 | | | | |
| Polymer 13 | | | | 2.6 | | | |
| Polymer 14 | | | | | | 2.6 | |
| Polymer 15 | | | | | | | 2.6 |
| Polymer 16 | | | | | 2.6 | | |
| BYK333 (Byk Chemie) (Mw: 8,000; HLB: 10) | | | | 1.0 | 1.0 | 1.0 | 1.0 |
| X-22-4272 (Shin-Etsu Chemical) (molecular weight: 4,200; HLB: 7) | 0.5 | | | | | | |
| Compound 5 (Mw: 7,700; HLB: 7) | | 0.5 | | | | | |
| Compound 6 (MW: 50,400; HLB: 7) | | | 0.5 | | | | |
| Water | 53.9 | 53.9 | 53.9 | 53.4 | 53.4 | 53.4 | 53.4 |
| Pigment content (% by mass) | 2.8 | 2.8 | 2.8 | 2.8 | 2.8 | 2.8 | 2.8 |
| Polymer content (% by mass) | 4.0 | 4.0 | 4.0 | 4.0 | 4.0 | 4.0 | 4.0 |
| Polymer/pigment (times) | 1.4 | 1.4 | 1.4 | 1.4 | 1.4 | 1.4 | 1.4 |

TABLE 4-7

Ink Formulation (Unit in upper portion: %)

| | Ink | | | | | | | | | | | | |
|---|---|---|---|---|---|---|---|---|---|---|---|---|---|
| | 64 | 65 | 66 | 67 | 68 | 69 | 70 | 71 | 72 | 73 | 74 | 75 | 76 |
| Glycerol | 5.0 | 5.0 | 5.0 | 5.0 | 5.0 | | | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 | 5.0 | 5.0 | 5.0 | 5.0 |
| Polyethylene glycol (av. molecular weight: 1,000) | 5.0 | 5.0 | 5.0 | 5.0 | 5.0 | 5.0 | 5.0 | 5.0 | 5.0 | 5.0 | 5.0 | 5.0 | 5.0 |
| 2-Pyrrolidone | | | | | | 10.0 | 10.0 | | | | | | |
| Pigment Dispersion 11 | 28.0 | 28.0 | 28.0 | 28.0 | 28.0 | 28.0 | 28.0 | 28.0 | 28.0 | 28.0 | 28.0 | 30.0 | 30.0 |
| Polymer 11 | 2.6 | 2.6 | 2.6 | 2.6 | 2.6 | 2.6 | 2.6 | 2.6 | 1.1 | 1.0 | 2.8 | 1.8 | 2.1 |
| FZ-2203 (Dow Corning Toray) (Mw: 33,400; HLB: 1) | 0.5 | | | | | | | | | | | | |
| FZ-2207 (Dow Corning Toray) (Mw: 29,300; HLB: 3) | | 0.5 | | | | | | | 0.5 | 0.5 | | | |
| FZ-2222 (Dow Corning Toray) (Mw: 27,400; HLB: 5) | | | 0.5 | | | 2.9 | 3.0 | 0.4 | | | 0.5 | 0.5 | 0.5 |
| FZ-2231 (Dow Corning Toray) (Mw: 29,200; HLB: 3) | | | | 0.5 | | | | | | | | | |
| Compound 7 (Mw: 49,000; HLB: 6) | | | | | 0.5 | | | | | | | | |
| Water | 53.9 | 53.9 | 53.9 | 53.9 | 53.9 | 46.5 | 46.4 | 54.0 | 55.4 | 55.5 | 53.7 | 52.7 | 52.4 |
| Pigment content (% by mass) | 2.8 | 2.8 | 2.8 | 2.8 | 2.8 | 2.8 | 2.8 | 2.8 | 2.8 | 2.8 | 2.8 | 3.0 | 3.0 |
| Polymer content (% by mass) | 4.0 | 4.0 | 4.0 | 4.0 | 4.0 | 4.0 | 4.0 | 4.0 | 2.5 | 2.4 | 4.2 | 3.3 | 3.6 |
| Polymer/pigment (times) | 1.4 | 1.4 | 1.4 | 1.4 | 1.4 | 1.4 | 1.4 | 1.4 | 0.89 | 0.86 | 1.5 | 1.1 | 1.2 |

TABLE 4-8

Ink Formulation (Unit in upper portion: %)

| | Ink | | | | | | | | | | | | |
|---|---|---|---|---|---|---|---|---|---|---|---|---|---|
| | 77 | 78 | 79 | 80 | 81 | 82 | 83 | 84 | 85 | 86 | 87 | 88 | 89 |
| Glycerol | 5.0 | 5.0 | 5.0 | 5.0 | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 | 5.0 | 5.0 | 5.0 | 5.0 |

TABLE 4-8-continued

Ink Formulation (Unit in upper portion: %)

| | Ink | | | | | | | | | | | | |
|---|---|---|---|---|---|---|---|---|---|---|---|---|---|
| | 77 | 78 | 79 | 80 | 81 | 82 | 83 | 84 | 85 | 86 | 87 | 88 | 89 |
| Polyethylene glycol (av. molecular weight: 1,000) | 5.0 | 5.0 | 5.0 | 5.0 | 5.0 | 5.0 | 5.0 | 5.0 | 5.0 | 5.0 | 5.0 | 5.0 | 5.0 |
| Pigment Dispersion 1 | 28.0 | | | | | | | | | | | | |
| Pigment Dispersion 2 | | 28.0 | | | | | | | | | | | |
| Pigment Dispersion 3 | | | 28.0 | | | | | | | | | | |
| Pigment Dispersion 4 | | | | 28.0 | | | | | | | | | |
| Pigment Dispersion 5 | | | | | 28.0 | | | | | | | | |
| Pigment Dispersion 6 | | | | | | 28.0 | | | | | | | |
| Pigment Dispersion 7 | | | | | | | 28.0 | | | | | | |
| Pigment Dispersion 8 | | | | | | | | 28.0 | | | | | |
| Pigment Dispersion 9 | | | | | | | | | 28.0 | | | | |
| Pigment Dispersion 10 | | | | | | | | | | 28.0 | | | |
| Pigment Dispersion 11 | | | | | | | | | | | | 28.0 | 28.0 |
| Pigment Dispersion 12 | | | | | | | | | | | 28.0 | | |
| Polymer 1 | 2.6 | | | | | | | | | | | | |
| Polymer 2 | | 2.6 | | | | | | | | | | | |
| Polymer 3 | | | 2.6 | | | | | | | | | | |
| Polymer 4 | | | | 2.6 | | | | | | | | | |
| Polymer 5 | | | | | 2.6 | | | | | | | | |
| Polymer 6 | | | | | | 2.6 | | | | | | | |
| Polymer 7 | | | | | | | 2.6 | | | | | | |
| Polymer 8 | | | | | | | | 2.6 | | | | | |
| Polymer 9 | | | | | | | | | 2.6 | | | | |
| Polymer 10 | | | | | | | | | | 2.6 | | | |
| Polymer 11 | | | | | | | | | | | | 2.6 | 2.6 |
| Polymer 12 | | | | | | | | | | | 2.6 | | |
| FZ-2207 (Dow Corning Toray) (Mw: 29,300; HLB: 3) | 0.5 | 0.5 | 0.5 | 0.5 | 0.5 | 0.5 | 0.5 | 0.5 | 0.5 | 0.5 | 0.5 | | |
| Compound 8 (Mw: 8,800; HLB: 6) | | | | | | | | | | | | 0.5 | |
| Compound 11 (Mw: 8,800; HLB: 1) | | | | | | | | | | | | | 0.5 |
| Water | 53.9 | 53.9 | 53.9 | 53.9 | 53.9 | 53.9 | 53.9 | 53.9 | 53.9 | 53.9 | 53.9 | 53.9 | 53.9 |
| Pigment content (% by mass) | 2.8 | 2.8 | 2.8 | 2.8 | 2.8 | 2.8 | 2.8 | 2.8 | 2.8 | 2.8 | 2.8 | 2.8 | 2.8 |
| Polymer content (% by mass) | 4.0 | 4.0 | 4.0 | 4.0 | 4.0 | 4.0 | 4.0 | 4.0 | 4.0 | 4.0 | 4.0 | 4.0 | 4.0 |
| Polymer/pigment (times) | 1.4 | 1.4 | 1.4 | 1.4 | 1.4 | 1.4 | 1.4 | 1.4 | 1.4 | 1.4 | 1.4 | 1.4 | 1.4 |

TABLE 4-9

Ink Formulation (Unit in upper portion: %)

| | Ink | | | | | | | | |
|---|---|---|---|---|---|---|---|---|---|
| | 90 | 91 | 92 | 93 | 94 | 95 | 96 | 97 | 98 |
| Glycerol | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 |
| Polyethylene glycol (av. molecular weight: 1,000) | 5.0 | 5.0 | 5.0 | 5.0 | 5.0 | 5.0 | 5.0 | 5.0 | 5.0 |
| Pigment Dispersion 11 | 28.0 | 28.0 | 28.0 | 28.0 | 28.0 | | | | |
| Pigment Dispersion 13 | | | | | | 28.0 | | | |
| Pigment Dispersion 14 | | | | | | | 28.0 | | |
| Pigment Dispersion 15 | | | | | | | | 28.0 | |
| Pigment Dispersion 16 | | | | | | | | | 28.0 |
| Polymer 11 | 2.6 | 2.6 | 2.6 | 2.6 | 2.6 | | | | |
| Polymer 13 | | | | | | 2.6 | | | |
| Polymer 14 | | | | | | | 2.6 | | |
| Polymer 15 | | | | | | | | 2.6 | |
| Polymer 16 | | | | | | | | | 2.6 |
| FZ-2207 (Dow Corning Toray) (Mw: 29,300; HLB: 3) | | | | | | 0.5 | 0.5 | 0.5 | 0.5 |
| FZ-2250 (Dow Corning Toray) | 0.5 | | | | | | | | |

TABLE 4-9-continued

| | Ink Formulation (Unit in upper portion: %) | | | | | | | | |
|---|---|---|---|---|---|---|---|---|---|
| | Ink | | | | | | | | |
| | 90 | 91 | 92 | 93 | 94 | 95 | 96 | 97 | 98 |
| (Mw: 167,500; HLB: 1) | | | | | | | | | |
| FZ-2208 (Dow Corning Toray) (Mw: 27,500; HLB: 7) | | 0.5 | | | | | | | |
| Compound 9 (Mw: 49,000; HLB: 7) | | | 0.5 | | | | | | |
| Compound 10 (Mw: 55,000; HLB: 6) | | | | 0.5 | | | | | |
| Compound 12 (Mw: 7,800; HLB: 6) | | | | | 0.5 | | | | |
| Water | 53.9 | 53.9 | 53.9 | 53.9 | 53.9 | 53.9 | 53.9 | 53.9 | 53.9 |
| Pigment content (% by mass) | 2.8 | 2.8 | 2.8 | 2.8 | 2.8 | 2.8 | 2.8 | 2.8 | 2.8 |
| Polymer content (% by mass) | 4.0 | 4.0 | 4.0 | 4.0 | 4.0 | 4.0 | 4.0 | 4.0 | 4.0 |
| Polymer/pigment (times) | 1.4 | 1.4 | 1.4 | 1.4 | 1.4 | 1.4 | 1.4 | 1.4 | 1.4 |

TABLE 4-10

| | Ink Formulation (Unit in upper column: %) | | | | | | | | | | | | | |
|---|---|---|---|---|---|---|---|---|---|---|---|---|---|---|
| | Ink | | | | | | | | | | | | | |
| | 99 | 100 | 101 | 102 | 103 | 104 | 105 | 106 | 107 | 108 | 109 | 110 | 111 | 112 |
| Glycerol | 5.0 | 5.0 | 5.0 | 5.0 | 5.0 | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 | 5.0 | 5.0 | 5.0 | 5.0 | 5.0 |
| Polyethylene glycol (av. molecular weight: 1,000) | 5.0 | 5.0 | 5.0 | 5.0 | 5.0 | 5.0 | 5.0 | 5.0 | 5.0 | 5.0 | 5.0 | 5.0 | 5.0 | 5.0 |
| Pigment Dispersion 17 | 28.0 | | | | | | | | | | | | | |
| Pigment Dispersion 18 | | 28.0 | | | | | | | | 28.0 | 28.0 | 28.0 | 30.0 | 30.0 |
| Pigment Dispersion 19 | | | 28.0 | | | | | | | | | | | |
| Pigment Dispersion 20 | | | | 28.0 | | | | | | | | | | |
| Pigment Dispersion 21 | | | | | 28.0 | | | | | | | | | |
| Pigment Dispersion 22 | | | | | | 28.0 | | | | | | | | |
| Pigment Dispersion 23 | | | | | | | 28.0 | | | | | | | |
| Pigment Dispersion 24 | | | | | | | | 28.0 | | | | | | |
| Pigment Dispersion 25 | | | | | | | | | 28.0 | | | | | |
| Polymer 17 | 2.6 | | | | | | | | | | | | | |
| Polymer 18 | | 2.6 | | | | | | | | 1.1 | 1.0 | 2.8 | 1.8 | 2.1 |
| Polymer 19 | | | 2.6 | | | | | | | | | | | |
| Polymer 20 | | | | 2.6 | | | | | | | | | | |
| Polymer 21 | | | | | 2.6 | | | | | | | | | |
| Polymer 22 | | | | | | 2.6 | | | | | | | | |
| Polymer 23 | | | | | | | 2.6 | | | | | | | |
| Polymer 24 | | | | | | | | 2.6 | | | | | | |
| Polymer 25 | | | | | | | | | 2.6 | | | | | |
| FZ-2104 (Dow Corning Toray) (Mw: 20,600; HLB: 9) | 0.5 | 0.5 | 0.5 | 0.5 | 0.5 | 0.5 | 0.5 | 0.5 | 0.5 | 0.5 | 0.5 | 0.5 | 0.5 | 0.5 |
| Water | 53.9 | 53.9 | 53.9 | 53.9 | 53.9 | 53.9 | 53.9 | 53.9 | 53.9 | 55.4 | 55.5 | 53.7 | 52.7 | 52.4 |
| Pigment content (% by mass) | 2.8 | 2.8 | 2.8 | 2.8 | 2.8 | 2.8 | 2.8 | 2.8 | 2.8 | 2.8 | 2.8 | 2.8 | 3.0 | 3.0 |
| Polymer content (% by mass) | 4.0 | 4.0 | 4.0 | 4.0 | 4.0 | 4.0 | 4.0 | 4.0 | 4.0 | 2.5 | 2.4 | 4.2 | 3.3 | 3.6 |
| Polymer/pigment (times) | 1.4 | 1.4 | 1.4 | 1.4 | 1.4 | 1.4 | 1.4 | 1.4 | 1.4 | 0.89 | 0.86 | 1.5 | 1.1 | 1.2 |

TABLE 4-11

Ink Formulation (Unit in upper portion: %)

| | Ink | | | | | |
|---|---|---|---|---|---|---|
| | 113 | 114 | 115 | 116 | 117 | 118 |
| Glycerol | 5.0 | 5.0 | 5.0 | 5.0 | 5.0 | 5.0 |
| Diethylene glycol | 5.0 | 5.0 | 5.0 | 5.0 | 5.0 | 5.0 |
| Polyethylene glycol (av. molecular weight: 1,000) | 5.0 | 5.0 | 5.0 | 5.0 | 5.0 | 5.0 |
| Pigment Dispersion 11 | | | 28.0 | 28.0 | 28.0 | |
| Pigment Dispersion 26 | 28.0 | | | | | |
| Pigment Dispersion 27 | | | | | | 28.0 |
| Pigment Dispersion 28 | | 28.0 | | | | |
| Polymer 11 | | | 2.6 | 2.6 | 2.6 | |
| Polymer 26 | 2.6 | | | | | |
| Polymer 27 | | | | | | 2.6 |
| Polymer 28 | | 2.6 | | | | |
| FZ-2104 (Dow Corning Toray) (Mw: 20,600; HLB: 9) | 0.5 | 0.5 | | | | 0.5 |
| BYK307 (Byk Chemie) (Mw: 31,500) | | | 2.9 | | | |
| BYK347 (Byk Chemie) (Mw: 1,500) | | | | 2.9 | | |
| BYK348 (Byk Chemie) (Mw: 2,800) | | | | | 2.9 | |
| Water | 53.9 | 53.9 | 51.5 | 51.5 | 51.5 | 53.9 |
| Pigment content (% by mass) | 2.8 | 2.8 | 2.8 | 2.8 | 2.8 | 2.8 |
| Polymer content (% by mass) | 4.0 | 4.0 | 4.0 | 4.0 | 4.0 | 4.0 |
| Polymer/pigment (times) | 1.4 | 1.4 | 1.4 | 1.4 | 1.4 | 1.4 |

Evaluation

Scratch Resistance:

An ink cartridge of an ink jet recording apparatus (trade name: BJ F900; manufactured by CANON INC.) was filled with each ink obtained as above, and was set in the apparatus at its position of a cyan ink. On Mitsubishi Photo Gloss Paper (available from Mitsubishi Paper Mills Limited), images (reference evaluation images) having a recording duty of 100% were formed at an ejection quantity of 4.5 ng and a resolution of 1,200 dpi×1,200 dpi in 8-pass bidirectional recording. Recorded images were left standing at room temperature for a day, and thereafter the images were scratched with finger nails under application of such strong pressure as to scratch the recording medium at its non-recorded areas. The recorded images thus scratched were visually observed to evaluate their scratch resistance. The scratch resistance was evaluated according to the evaluation criteria shown below. The results are shown in Tables 5-1 to 5-4.

A: No nail mark was left on the surfaces of images.

B: Nail marks were left on the surfaces of images, but no coloring material was scraped off.

C: Nail marks were left on the surfaces of images, and the coloring material was scraped off slightly.

D: The coloring material was scraped off obviously, though the surface of the recording medium was not exposed.

E: There was no problem when images were gently touched, but the coloring material was scraped off to such an extent that the surface of the recording medium was revealed when the images were scratched under application of such strong pressure as to scratch the recording medium at its non-recorded areas.

Coefficient of Dynamic Friction:

The coefficient of dynamic friction in image areas of the recorded images obtained as above (reference evaluation images: images having a recording duty of 100%, formed at an ejection quantity of 4.5 ng and at a resolution of 1,200 dpi×1,200 dpi in 8-pass bidirectional recording) was measured in the following way. Specifically, in the image areas of the reference evaluation images, the coefficient of dynamic friction of the images against a polymethyl methacrylate (PMMA) ball was measured with a surface property tester (trade name: HEIDON TRIBOGEAR Type 14DR, manufactured by Shinto Kagaku K.K.). Setting the vertical load to be applied to the PMMA ball at 50 g, and its movement speed at 2 mm/sec, the horizontal force acting in the movement direction of the PMMA ball was measured through a load cell, where the ratio of horizontal-direction force to vertical-load force was calculated as the coefficient of dynamic friction. The values of the coefficient of dynamic friction are shown in Tables 5-1 to 5-4.

Storage Stability:

Each ink obtained as above was put into a container made of TEFLON (trade name) and was left standing at a temperature of 60° C. for a month. The particle diameter of the pigment in each ink before and after storage was measured with a laser zeta potentiometer (trade name: ELS-8000, manufactured by Ohtsuka Denshi Kogyo K.K.) to evaluate storage stability. The storage stability was evaluated according to the evaluation criteria shown below. The results are shown in Tables 5-1 to 5-4.

A: The particle diameter of the pigment after storage was less than 1.1 times the particle diameter of the pigment before storage.

B: Although no agglomerate was generated after the storage, the particle diameter of the pigment after storage was 1.1 or more times the particle diameter of the pigment before storage.

C: After storage, agglomerates of the pigments were produced.

Ejection Property:

(State of Orifice Face and Ejection Stability)

An ink cartridge for an ink jet recording apparatus (trade name: PIXUS 850i; manufactured by CANON INC.) was filled with each ink obtained as above, and was set at the cyan ink position of a modified apparatus of the above apparatus. Then, on three sheets of Office Planner (available from CANON INC.), images of 50% in recording duty and 18 cm×24 cm in size were recorded in a default mode. In this recording, the cleaning of a recording head was performed once for each recording on one sheet by using a wiper blade for PIXUS 850i. Thereafter, a nozzle check pattern for PIXUS 850i was recorded, where the state of the recording head surface was visually examined to evaluate the state of the orifice face. The state of the orifice face was evaluated according to the evaluation criteria shown below. The results are shown in Tables 5-1 to 5-4. The nozzle check pattern was also visually examined to evaluate ejection stability. The ejection stability was evaluated according to the evaluation criteria shown below. The results are shown in Tables 5-1 to 5-4.

(State of Orifice Race)

A: Almost no ink was present around ejection orifices.

B: Ink was somewhat present around ejection orifices.

C: Ink liquid films in belt form were present around ejection orifices.

(Ejection Stability)

A: Recording was normally performable without disruption in the nozzle check pattern.

B: Disruption was somewhat seen in the nozzle check pattern, but faulty ejection was not seen.

C: Obvious faulty ejection and disruption were seen in the nozzle check pattern, and normal recording was not performable.

TABLE 5-1

Evaluation Results

| | | Ink | Properties of images — Scratch resistance | Coefficient of dynamic friction | Storage stability | Ejection property — State of orifice face | Ejection stability |
|---|---|---|---|---|---|---|---|
| Example: | 1 | 1 | B | 0.20 | A | B | A |
| | 2 | 2 | C | 0.37 | A | B | A |
| | 3 | 3 | B | 0.27 | A | B | A |
| | 4 | 4 | B | 0.28 | A | B | A |
| | 5 | 5 | B | 0.25 | A | B | A |
| | 6 | 6 | C | 0.35 | A | B | A |
| | 7 | 7 | C | 0.37 | A | B | A |
| | 8 | 8 | B | 0.17 | A | B | B |
| | 9 | 9 | B | 0.17 | B | B | B |
| | 10 | 10 | C | 0.40 | A | B | A |
| | 11 | 11 | B | 0.30 | A | B | A |
| | 12 | 12 | C | 0.31 | A | B | A |
| | 13 | 13 | B | 0.15 | A | B | B |
| | 14 | 14 | C | 0.33 | A | B | A |
| | 15 | 15 | B | 0.29 | A | B | A |
| | 16 | 16 | B | 0.26 | A | A | A |
| | 17 | 17 | C | 0.32 | A | A | A |
| | 18 | 18 | B | 0.26 | A | A | A |
| | 19 | 19 | B | 0.24 | A | A | A |
| | 20 | 20 | C | 0.37 | A | A | A |
| | 21 | 21 | A | 0.08 | A | B | B |
| | 22 | 22 | B | 0.22 | A | A | A |
| | 23 | 23 | B | 0.21 | A | A | A |
| | 24 | 24 | B | 0.27 | A | A | A |
| | 25 | 25 | B | 0.14 | A | B | A |
| | 26 | 26 | B | 0.17 | A | B | A |
| Comparative | 1 | 27 | E | 0.75 | A | B | A |
| Example: | 2 | 28 | E | 0.77 | A | B | A |
| | 3 | 29 | E | 0.74 | A | B | A |
| | 4 | 30 | D | 0.41 | A | B | A |
| | 5 | 31 | D | 0.43 | A | A | A |
| | 6 | 32 | D | 0.41 | A | A | A |
| Reference | 1 | 33 | A | 0.07 | A | C | C |
| Example: | 2 | 34 | C | 0.21 | C | C | B |

The evaluation results of ejection stability were "B" both in Examples 8 and 9. However, the disrupted state of the nozzle check pattern was somewhat less in Example 8 than in Example 9. In this case, the state of kogation of ink with the recording head heater was observed on an optical microscope to find that the occurrence of kogation is less in Example 8 than Example 9.

TABLE 5-2

Evaluation Results

| | | Ink | Properties of images — Scratch resistance | Coefficient of dynamic friction | Storage stability | Ejection property — State of orifice face | Ejection stability |
|---|---|---|---|---|---|---|---|
| Example: | 27 | 35 | C | 0.38 | A | B | A |
| | 28 | 36 | C | 0.37 | A | B | A |
| | 29 | 37 | A | 0.09 | A | B | B |
| | 30 | 38 | A | 0.08 | B | B | B |
| | 31 | 39 | C | 0.40 | A | B | A |
| | 32 | 40 | B | 0.21 | A | B | A |
| | 33 | 41 | B | 0.30 | A | A | A |
| | 34 | 42 | C | 0.32 | A | A | A |
| | 35 | 43 | B | 0.24 | A | B | B |
| | 36 | 44 | C | 0.32 | A | B | A |
| | 37 | 45 | B | 0.28 | A | B | A |
| | 38 | 46 | C | 0.31 | A | A | A |

TABLE 5-2-continued

Evaluation Results

| | | Ink | Properties of images — Scratch resistance | Coefficient of dynamic friction | Storage stability | Ejection property — State of orifice face | Ejection stability |
|---|---|---|---|---|---|---|---|
| | 39 | 47 | C | 0.36 | A | A | A |
| | 40 | 48 | C | 0.32 | A | A | A |
| | 41 | 49 | B | 0.30 | A | A | A |
| | 42 | 50 | C | 0.36 | A | A | A |
| | 43 | 51 | B | 0.13 | A | B | B |
| | 44 | 52 | B | 0.24 | A | A | A |
| | 45 | 53 | B | 0.22 | A | A | A |
| | 46 | 54 | B | 0.29 | A | A | A |
| | 47 | 55 | B | 0.15 | A | B | A |
| | 48 | 56 | B | 0.18 | A | B | A |
| Comparative | 7 | 57 | E | 0.57 | A | B | A |
| Example: | 8 | 58 | D | 0.41 | A | B | A |
| | 9 | 59 | D | 0.44 | A | B | B |
| | 10 | 60 | D | 0.42 | A | A | A |
| | 11 | 61 | D | 0.41 | A | A | A |
| Reference | 3 | 62 | B | 0.11 | A | C | C |
| Example: | 4 | 63 | B | 0.26 | C | C | B |

The evaluation results of ejection stability were "B" both in Examples 29 and 30. However, the disrupted state of the nozzle check pattern was somewhat less in Example 29 than in Example 30. In this case, the state of any kogation of ink on the recording head heater was observed with an optical microscope to find that the occurrence of kogation was less in Example 29 than in Example 30.

TABLE 5-3

Evaluation Results

| | | Ink | Properties of images — Scratch resistance | Coefficient of dynamic friction | Storage stability | Ejection property — State of orifice face | Ejection stability |
|---|---|---|---|---|---|---|---|
| Example: | 49 | 64 | B | 0.13 | B | B | A |
| | 50 | 65 | A | 0.09 | A | B | A |
| | 51 | 66 | C | 0.35 | A | B | A |
| | 52 | 67 | B | 0.11 | A | B | A |
| | 53 | 68 | C | 0.38 | A | B | A |
| | 54 | 69 | B | 0.15 | A | B | B |
| | 55 | 70 | B | 0.15 | B | B | B |
| | 56 | 71 | C | 0.40 | A | B | A |
| | 57 | 72 | B | 0.30 | A | A | A |
| | 58 | 73 | C | 0.31 | A | A | A |
| | 59 | 74 | C | 0.33 | A | B | B |
| | 60 | 75 | C | 0.40 | A | B | A |
| | 61 | 76 | C | 0.37 | A | B | A |
| | 62 | 77 | B | 0.22 | A | A | A |
| | 63 | 78 | C | 0.31 | A | A | A |
| | 64 | 79 | B | 0.17 | A | A | A |
| | 65 | 80 | B | 0.15 | A | A | A |
| | 66 | 81 | C | 0.34 | A | A | A |
| | 67 | 82 | A | 0.05 | A | B | B |
| | 68 | 83 | B | 0.12 | A | A | A |
| | 69 | 84 | B | 0.12 | A | A | A |
| | 70 | 85 | B | 0.19 | A | A | A |
| | 71 | 86 | A | 0.07 | A | B | A |
| | 72 | 87 | A | 0.09 | A | B | A |
| | 73 | 88 | C | 0.36 | A | B | A |
| | 74 | 89 | C | 0.32 | B | B | A |

TABLE 5-3-continued

| | Ink | Scratch resistance | Coefficient of dynamic friction | Storage stability | State of orifice face | Ejection stability |
|---|---|---|---|---|---|---|
| Comparative Example: | 12 | 90 | D | 0.46 | A | B | A |
| | 13 | 91 | D | 0.43 | A | B | A |
| | 14 | 92 | D | 0.41 | A | B | A |
| | 15 | 93 | D | 0.42 | A | B | A |
| | 16 | 94 | D | 0.43 | A | B | A |
| | 17 | 95 | D | 0.41 | A | A | A |
| | 18 | 96 | D | 0.42 | A | A | A |
| Reference Example: | 5 | 97 | A | 0.05 | A | C | C |
| | 6 | 98 | C | 0.14 | C | C | B |

The evaluation results of ejection stability were "B" both in Examples 54 and 55. However, the disrupted state of the nozzle check pattern was somewhat less in Example 54 than in Example 55. In this case, the state of any kogation of ink on the recording head heater was observed with an optical microscope to find that the occurrence of kogation was less in Example 54 than in Example 55.

TABLE 5-4

Evaluation Results

| | Ink | Scratch resistance | Coefficient of dynamic friction | Storage stability | State of orifice face | Ejection stability |
|---|---|---|---|---|---|---|
| Example: | 75 | 99 | C | 0.36 | A | A | A |
| | 76 | 100 | B | 0.30 | A | B | A |
| | 77 | 101 | C | 0.39 | A | A | A |
| | 78 | 102 | C | 0.37 | A | A | A |
| | 79 | 103 | B | 0.27 | A | B | A |
| | 80 | 104 | C | 0.34 | A | B | A |
| | 81 | 105 | C | 0.39 | A | A | A |
| | 82 | 106 | C | 0.32 | A | B | A |
| | 83 | 107 | C | 0.31 | A | B | A |
| | 84 | 108 | C | 0.34 | A | A | A |
| | 85 | 109 | C | 0.37 | A | A | A |
| | 86 | 110 | B | 0.28 | A | B | B |
| | 87 | 111 | C | 0.38 | A | A | A |
| | 88 | 112 | C | 0.34 | A | A | A |
| Comparative Example: | 19 | 113 | D | 0.41 | A | A | A |
| | 20 | 114 | D | 0.48 | A | A | A |
| | 21 | 115 | E | 0.52 | A | B | A |
| | 22 | 116 | E | 0.67 | A | B | A |
| | 23 | 117 | E | 0.62 | A | B | A |
| Reference Example: | 7 | 118 | B | 0.27 | A | C | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2007-030896, filed Feb. 9, 2007, No. 2007-031183, filed Feb. 9, 2007, No. 2007-031330, filed Feb. 9, 2007 and No. 2008-014345, filed Jan. 25, 2008, which are hereby incorporated by reference herein in their entirety.

What is claimed is:

1. A pigment ink comprising:
a pigment;
a modified siloxane compound;
water; and
a polymer,
wherein the modified siloxane compound comprises at least one selected from the group consisting of a modified siloxane compound represented by the following Formula (1) and a modified siloxane compound represented by the following Formula (2),
wherein the content (% by mass) of the water is 50.0% by mass or more and 95.0% by mass or less based on the total mass of the ink, and
wherein the polymer is at least one selected from the group consisting of a polymer A which has an acid value of from 90 mgKOH/g or more to 150 mgKOH/g or less and in which a hydrogen bond parameter ($\delta h$) of the polymer that is obtained by solubility parameters of monomers constituting the polymer is from $1.0\ \mathrm{cal}^{0.5}/\mathrm{cm}^{1.5}$ or more to $3.7\ \mathrm{cal}^{0.5}/\mathrm{cm}^{1.5}$ or less, and a polymer B which has an acid value of from more than 150 mgKOH/g to 200 mgKOH/g or less and in which a hydrogen bond parameter ($\delta h$) of the polymer that is obtained by solubility parameters of monomers constituting the polymer is from $1.0\ \mathrm{cal}^{0.5}/\mathrm{cm}^{1.5}$ or more to $1.5\ \mathrm{cal}^{0.5}/\mathrm{cm}^{1.5}$ or less:

Formula (1)

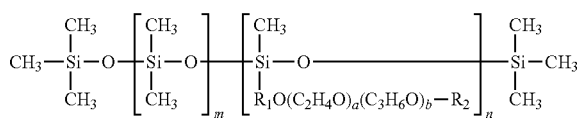

where the modified siloxane compound represented by Formula (1) has a weight average molecular weight of from 8,000 or more to 30,000 or less; in Formula (1), $R_1$ is an alkylene group having 1 to 20 carbon atom(s), $R_2$ is a hydrogen atom or an alkyl group having 1 to 20 carbon atom(s), m is from 1 or more to 250 or less, n is from 1 or more to 100 or less, a is from 1 or more to 100 or less, and b is from 0 or more to 100 or less;

Formula (2)

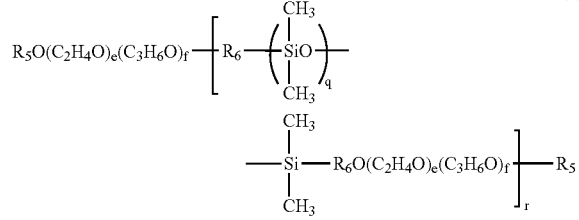

where the modified siloxane compound represented by Formula (2) has a weight average molecular weight of from 8,000 or more to less than 50,000 and an HLB of from 1 or more to less than 7; in Formula (2), $R_5$s are each independently a hydrogen atom or an alkyl group having 1 to 20 carbon atom(s), $R_6$ is an alkylene group having 1 to 20 carbon atom(s), q is from 1 or more to 100 or less, r is from 1 or more to 100 or less, e is from 1 or more to 100 or less, and f is from 0 or more to 100 or less.

2. The pigment ink according to claim 1, wherein the modified siloxane compound represented by Formula (1) has an HLB of from 5 or more to 11 or less.

3. The pigment ink according to claim 1, wherein the polymer A comprises at least one type of monomer selected from the group consisting of styrene, n-butyl acrylate and benzyl methacrylate.

4. The pigment ink according to claim 1, wherein the polymer B comprises at least one type of monomer selected from the group consisting of styrene and α-methylstyrene.

5. The pigment ink according to claim 1, wherein the content (% by mass) of the polymer in the ink is from 2.5% by mass or more to 4.0% by mass or less based on the total mass of the ink.

6. The pigment ink according to claim 1, wherein the content (% by mass) of the polymer based on the total mass of the ink is at least 1.2 times the content (% by mass) of the pigment based on the total mass of the ink.

7. An ink jet recording method comprising ejecting an ink by ink jet method to perform recording on a recording medium, wherein the pigment ink according to claim 1 is used as the ink.

8. An ink jet recording method according to claim 7, wherein the recording medium is a paper recording medium.

9. An ink cartridge comprising an ink storing portion which stores an ink therein, wherein the ink stored in the ink storing portion is the pigment ink according to claim 1.

10. A recording unit comprising an ink storing portion which stores an ink therein and a recording head which ejects the ink therefrom, wherein the ink stored in the ink storing portion is the pigment ink according to claim 1.

11. An ink jet recording apparatus comprising an ink storing portion which stores an ink therein and a recording head which ejects the ink therefrom, wherein the ink stored in the ink storing portion is the pigment ink according to claim 1.

12. The pigment ink according to claim 1, wherein the hydrogen bond parameter ($\delta h$) for polymer A is from 1.2 $cal^{0.5}/cm^{1.5}$ or more to 1.8 $cal^{0.5}/cm^{1.5}$ or less, and the hydrogen bond parameter ($\delta h$) for polymer B is from 1.2 $cal^{0.5}/cm^{1.5}$ or more to 1.5 $cal^{0.5}/cm^{1.5}$ or less.

13. The pigment ink according to claim 1, wherein for each of Formulae (1) and (2), the modified siloxane compound has a weight average molecular weight of from 8,500 or more to 30,000 or less.

14. The pigment ink according to claim 1, wherein the modified siloxane compound is the modified siloxane compound represented by Formula (1).

15. The pigment ink according to claim 14, wherein the polymer is the polymer B.

16. The pigment ink according to claim 1, wherein the polymer is the polymer B.

17. The pigment ink according to claim 1, wherein the pigment is dispersed in the ink by a dispersing polymer that is different from both the polymer A and the polymer B.

18. The pigment ink according to claim 1, wherein the modified siloxane compound is the modified siloxane compound represented by Formula (2).

* * * * *